US012147151B2

(12) United States Patent
Shim et al.

(10) Patent No.: US 12,147,151 B2
(45) Date of Patent: Nov. 19, 2024

(54) CAMERA BRACKET AND ELECTRONIC DEVICE INCLUDING SAME

(71) Applicant: SAMSUNG ELECTRONICS CO., LTD., Suwon-si (KR)

(72) Inventors: Minchang Shim, Suwon-si (KR); Yongseok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 150 days.

(21) Appl. No.: 17/943,583

(22) Filed: Sep. 13, 2022

(65) Prior Publication Data
US 2023/0053571 A1 Feb. 23, 2023

Related U.S. Application Data

(63) Continuation of application No. PCT/KR2022/012208, filed on Aug. 16, 2022.

(30) Foreign Application Priority Data

Aug. 18, 2021 (KR) .................. 10-2021-0108722

(51) Int. Cl.
  *G03B 30/00* (2021.01)
  *G03B 17/56* (2021.01)
(52) U.S. Cl.
  CPC ........... *G03B 30/00* (2021.01); *G03B 17/561* (2013.01)
(58) Field of Classification Search
  CPC ...... G03B 30/00; G03B 17/561; G03B 17/02; G03B 19/22; H04M 1/0264; H04N 23/51; H04N 23/57
  See application file for complete search history.

(56) References Cited

U.S. PATENT DOCUMENTS

| 9,479,758 | B2 | 10/2016 | Woo et al. |
| 10,969,659 | B2 | 4/2021 | Park et al. |
| 11,310,400 | B2 | 4/2022 | Choi et al. |
| 2021/0152717 | A1 | 5/2021 | Tsuzaki et al. |
| 2022/0070347 | A1 | 3/2022 | Han |

(Continued)

FOREIGN PATENT DOCUMENTS

| CN | 111818248 A | 10/2020 |
| CN | 213754663 | 7/2021 |

(Continued)

OTHER PUBLICATIONS

Search Report and Written Opinion dated Nov. 15, 2022 issued in International Patent Application No. PCT/KR2022/012208.

*Primary Examiner* — Christopher E Mahoney
(74) *Attorney, Agent, or Firm* — Nixon & Vanderhye, P.C.

(57) ABSTRACT

According to an embodiment of the disclosure, an electronic device may include a housing, a support, a first bracket, a second bracket, a first camera module including a camera, and a second camera module including a camera. The support may be positioned inside the housing. The first bracket and the second bracket may be positioned on one surface of the support. The first camera module may be positioned on the first bracket. The second camera module may be positioned on the second bracket. The first bracket may include a first protrusion. The second bracket may include a first hole into which the first protrusion is inserted, the first hole having a larger width than the first protrusion.

20 Claims, 16 Drawing Sheets

(56) References Cited

U.S. PATENT DOCUMENTS

2022/0417392 A1    12/2022  Lee
2023/0421683 A1*   12/2023  McGuire ......... H04M 1/724631

FOREIGN PATENT DOCUMENTS

| JP | 2019-184854 A | 10/2019 |
|----|---------------|---------|
| KR | 10-2013-0015293 A | 2/2013 |
| KR | 10-2018-0047724 A | 5/2018 |
| KR | 10-2018-0102945 A | 9/2018 |
| KR | 10-2019-0056035 | 5/2019 |
| KR | 10-2020-0091264 | 7/2020 |
| KR | 10-2020-0101240 | 8/2020 |
| KR | 10-2021-0012675 A | 2/2021 |
| KR | 10-2021-0070543 | 6/2021 |

* cited by examiner

CAMERA BRACKET AND ELECTRONIC DEVICE INCLUDING SAME

CROSS-REFERENCE TO RELATED APPLICATIONS

This application is a continuation of International Application No. PCT/KR2022/012208 designating the United States, filed on Aug. 16, 2022, in the Korean Intellectual Property Receiving Office and claiming priority to Korean Patent Application No. 10-2021-0108722, filed on Aug. 18, 2021, in the Korean Intellectual Property Office, the disclosures of which are incorporated by reference herein in their entireties.

BACKGROUND

Field

The disclosure relates to a camera bracket and an electronic device including the same.

Description of Related Art

The electronic device may include a plurality of camera modules. The plurality of camera modules may be positioned inside the electronic device using a camera bracket.

In the case of implementing an electronic device by changing the size thereof, there may be restrictions in terms of the exterior design of the electronic device related to a plurality of camera modules when the camera bracket is not redesigned, or there may be an increase in cost if the camera bracket is redesigned.

SUMMARY

Embodiments of the disclosure provide a camera bracket capable of adjusting a position between a plurality of camera modules and an electronic device including the same.

According to an example embodiment of the disclosure, an electronic device may include: a housing, a support, a first bracket, a second bracket, a first camera module including a camera, and a second camera module including a camera. The support may be positioned inside the housing. The first bracket and the second bracket may be positioned on one surface of the support. The first camera module may be positioned on the first bracket. The second camera module may be positioned on the second bracket. The first bracket may include a first protrusion. The second bracket may include a first hole into which the first protrusion is inserted and which has a larger width than the first protrusion.

According to an example embodiment, a camera bracket may include a first bracket on which a first camera module is positioned, and a second bracket on which a second camera module is positioned. The first bracket may include a first protrusion. The second bracket may include a first hole into which the first protrusion is inserted and which has a larger width than the first protrusion.

The camera bracket according to various example embodiments enables position adjustment between the plurality of camera modules to match the size of the electronic device or the exterior design of the electronic device related to the plurality of camera modules. Therefore, the camera bracket is applicable to various electronic devices without redesign, so that it is possible to reduce the manufacturing cost of an electronic device or to enhance the degree of design freedom of the electronic device.

In addition, effects that can be obtained or predicted by various embodiments may be directly or implicitly disclosed in the detailed description of the embodiments of the disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
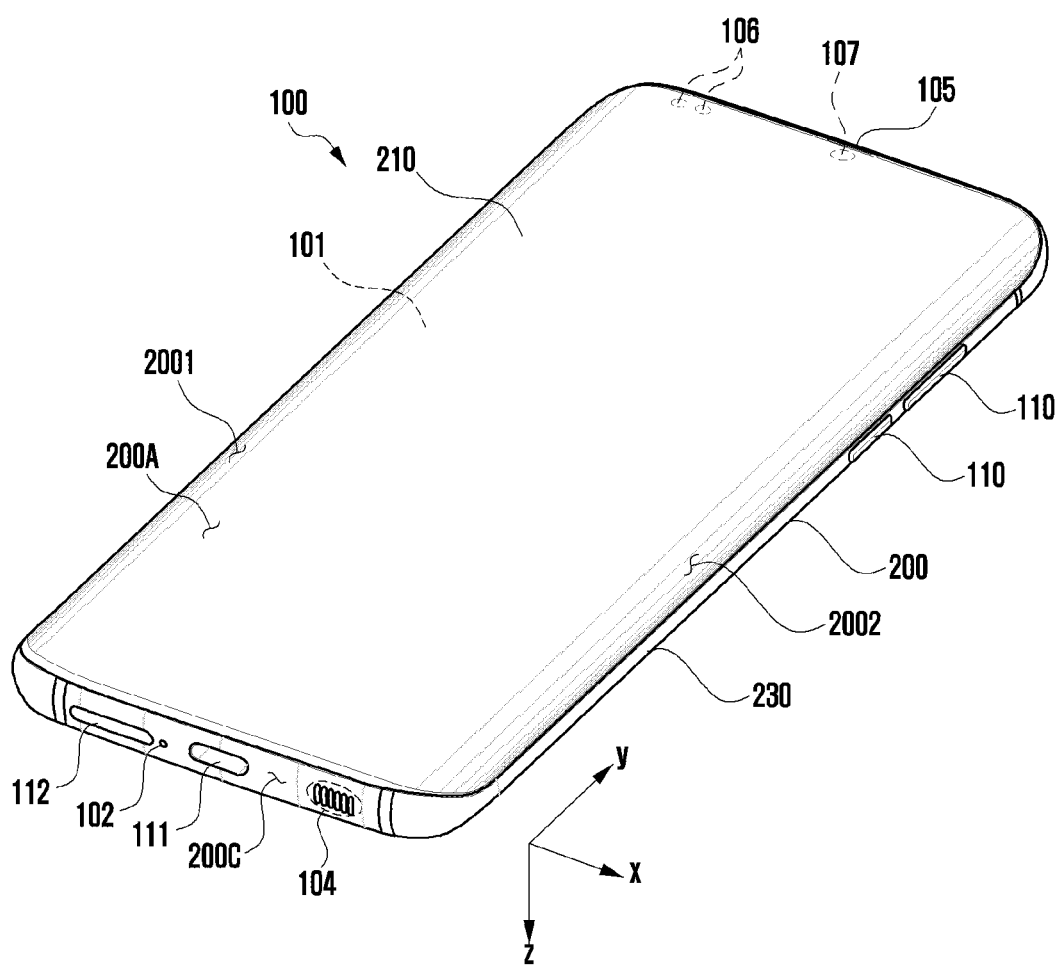
FIG. 1 is a front perspective view of an electronic device according to various embodiments.

Hereinafter, various example embodiments of the disclosure will be described in greater detail with reference to the accompanying drawings.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one or all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order).

According to various embodiments, each element of the above-described elements may include a single entity or multiple entities, and some of the multiple entities may be separately disposed in any other element. According to various embodiments, one or more of the above-described elements or operations may be omitted, or one or more other elements or operations may be added. Alternatively or additionally, a plurality of elements may be integrated into a single element. In such a case, according to various embodiments, the integrated element may still perform one or more functions of each of the plurality of elements in the same or similar manner as they are performed by a corresponding one of the plurality of elements before the integration.

Figure 2:
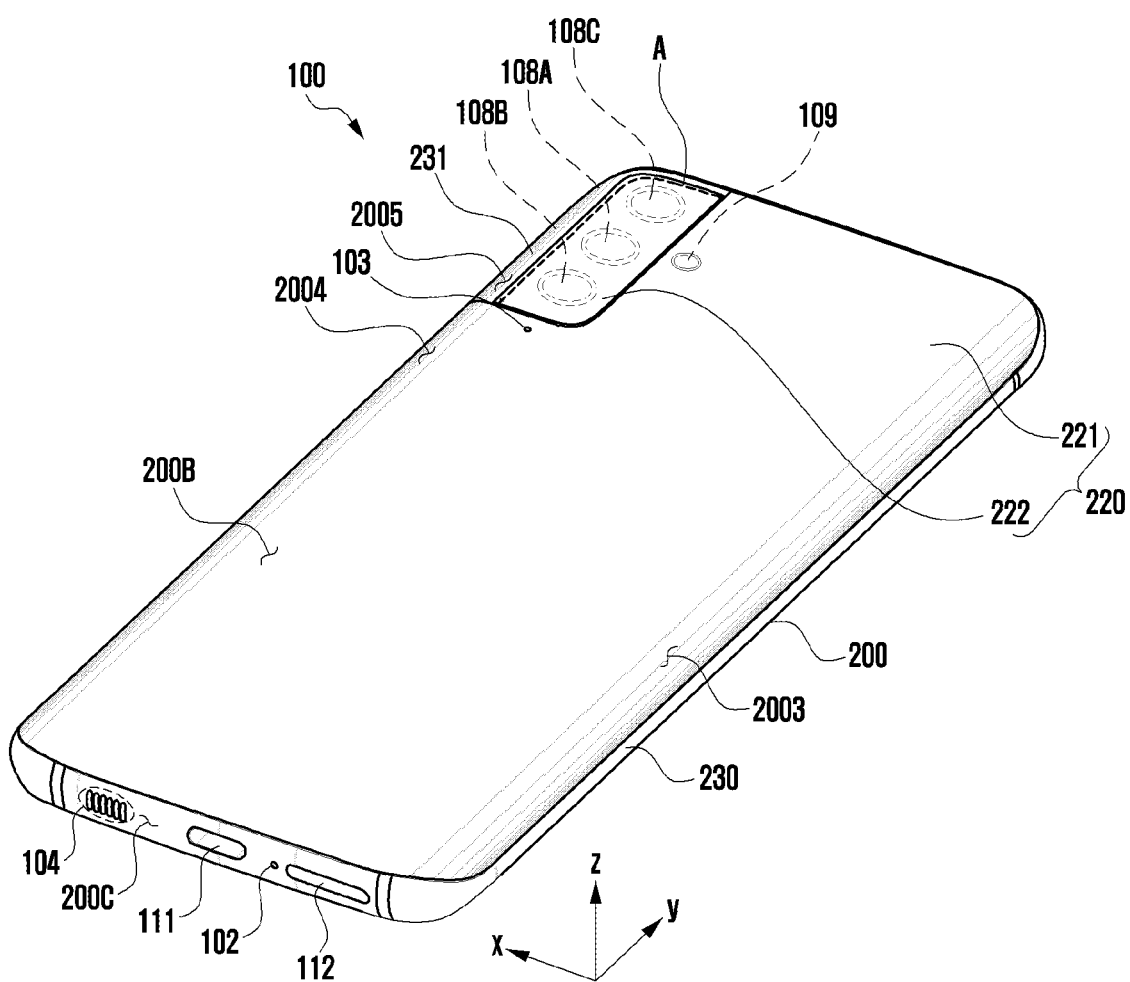
FIG. 2 is a rear perspective view of the electronic device according to various embodiments.

FIG. 1 is a front perspective view of an electronic device 100 according to various embodiments. FIG. 2 is a rear perspective view of the electronic device 100 according to various embodiments.

In various embodiments of the disclosure, for convenience of explanation, the direction in which a display 101 included in the electronic device 100 is visually exposed (e.g., the −z-axis direction) is defined as the front side, and the opposite direction (e.g., the +z-axis direction) is defined as the rear side. For the avoidance of doubt, the term "visually exposed" may be used interchangeably with the term "visible" and includes an example in which a cover plate (e.g., front plate 210) is included over the display.

FIGS. 1 and 2, the electronic device 100 may include a housing 200 that provides an external appearance of the electronic device 100. The housing 200 may provide, for example, a front surface 200A of the electronic device 100, a rear surface 200B of the electronic device 100, and a side surface 200C of the electronic device 100 surrounding a space between the front surface 200A and the rear surface 200B. In various embodiments, the housing 200 may refer to a structure (e.g., a housing structure) that provides at least a portion of the front surface 200A, the rear surface 200B, and the side surface 200C.

According to an embodiment, the housing 200 may include a front plate 210, a rear plate 220, and/or a bezel structure 230. At least a portion of the front surface 200A of the electronic device 100 may be provided by the front plate 210. The front plate 210 may be substantially transparent and may include, for example, a glass plate or a polymer plate including various coating layers. At least a portion of the rear surface 200B of the electronic device 100 may be provided by the rear plate 220. In an embodiment, the rear plate 220 may include a first rear plate 221 providing a portion of the rear surface 200B, and a second rear plate 222 providing another portion of the rear surface 200B. The first rear plate 221 and the second rear plate 222 may be substantially opaque. The first rear plate 221 and/or the second rear plate 222 may be formed of, for example, coated or colored glass, ceramic, polymer, metal, or a combination of at least two of these materials. As another example, the first rear plate 221 and/or the second rear plate 222 may include aluminum, an aluminum alloy, magnesium, a magnesium alloy, or an alloy including iron (e.g., stainless steel). The bezel structure 230 may surround at least a portion of the space between the front plate 210 and the rear plate 220. At least a portion of the side surface 200C of the electronic device 100 may be provided by the bezel structure 230. In various embodiments, the bezel structure 230 is an element substantially providing the side surface 200C of the electronic device 100 and may be referred to as a "side bezel structure" or a "side member". The bezel structure 230 may include, for example, a metal and/or a polymer.

According to an embodiment, the front plate 210 may include a first curved portion 2001 and a second curved portion 2002 that are bent from the front surface 200A toward the rear surface 200B and extend seamlessly. The first curved portion 2001 and the second curved portion 2002 may be provided adjacent to both edges of the front plate 210 positioned opposite to each other. The first curved portion 2001 and the second curved portion 2002 may be positioned to be symmetrically to each other, for example, with a flat portion (not illustrated) of the front plate 210 interposed therebetween.

According to an embodiment, the first rear plate 221 may include a third curved portion 2003 and a fourth curved portion 2004 that are bent from the rear surface 200B toward the front surface 200A and extend seamlessly. The third curved portion 2003 may be provided adjacent to one edge of the first rear plate 221 to correspond to the first curved portion 2001 of the front plate 210. The fourth curved portion 2004 may be provided adjacent to the other edge of the first rear plate 221 to correspond to the second curved portion 2002 of the front plate 210. In an embodiment, a portion 231 of the bezel structure 230 may include a fifth curved portion 2005 smoothly connected with the fourth curved portion 2004 of the first rear plate 221 to correspond to the second curved portion 2002 of the front plate 210. For example, the curved portion including the fourth curved portion 2004 and the fifth curved portion 2005 at one side may be positioned to be symmetrical to the third curved portion 2003 at the other side. In an embodiment, the second rear plate 222 may be positioned to correspond to the fifth curved portion 2005. For example, the portion 231 of the bezel structure 230 that provides the fifth curved portion 2005 may extend along the edge provided by the second rear plate 222 (the edge extending along the dotted line indicated by reference numeral "A") in the edge (or the border) of the rear plate 220 or may come into contact with the second rear plate 220. In various embodiments, the fifth curved portion 2005 may be provided by the first rear plate 221 or the second rear plate 222. In various embodiments, the first rear plate 221 and the second rear plate 222 may be integrally provided. In various embodiments, the first rear plate 221 and/or the second rear plate 222 may be integrally provided with the bezel structure 230 and may be formed of the same material as the bezel structure 230 (e.g., a metal material such as aluminum).

According to various embodiments, the housing 200 may be implemented without at least one of the first curved portion 2001, the second curved portion 2002, the third curved portion 2003, or the curved surface including the fourth curved portion 2004 and the fifth curved portion 2005.

According to an embodiment, the electronic device 100 may include a display 101, a first audio module 102, a second audio module 103, a third audio module 104, a fourth audio module 105, a sensor module 106, a front camera module 107, a plurality of rear camera modules 108A, 108B, and 108C, a light-emitting module 109, an input module 110, a first connection terminal module 111, or a second connection terminal module 112. In various embodiments, at least one of the above-mentioned components may be omitted from the electronic device 100 or other components may be additionally included in the electronic device 200.

A display area (e.g., a screen display area or an active area) of the display 101 may be visually exposed through, for example, the front plate 210. In an embodiment, the electronic device 100 may be implemented to make the display area, which is visible through the front plate 210, appear as large as possible (e.g., a large screen or a full screen). For example, the display 101 may be implemented to have a periphery having substantially the same shape as the shape of the periphery of the front plate 210. As another example, the distance between the periphery of the display 101 and the periphery of the front plate 210 may be substantially constant. In an embodiment, the display 101 may include a touch detection circuit. In various embodiments, the display 101 may include a pressure sensor capable of measuring the intensity (pressure) of a touch. In various embodiments, the display 101 may be coupled to or positioned adjacent to a digitizer (e.g., an electromagnetic induction panel) that detects a magnetic field-type electronic pen (e.g., a stylus pen).

The first audio module 102 may include, for example, a first microphone positioned inside the electronic device 100 and a first microphone hole provided in the side surface 200C to correspond to the first microphone. The second audio module 103 may include, for example, a second microphone positioned inside the electronic device 100 and a second microphone hole provided in the rear surface 200B to correspond to the second microphone. The second microphone hole may be provided in, for example, the first rear plate 221. In various embodiments, the second microphone hole may be provided in the second rear plate 222. The position or number of audio modules in terms of the microphones is not limited to the illustrated example and may vary. In various embodiments, the electronic device 100 may include a plurality of microphones used to detect the direction of sound.

The third audio module 104 may include, for example, a first speaker positioned inside the electronic device 100 and a first speaker hole provided in the side surface 200C to correspond to the first speaker. The fourth audio module 105 may include, for example, a second speaker positioned inside the electronic device 100 and a second speaker hole provided in the front surface 200A to correspond to the second speaker. In an embodiment, the first speaker may include an external speaker. In an embodiment, the second speaker may include a receiver for a call, and the second speaker hole may be referred to as a receiver hole. The position or number of third audio modules 104 or fourth audio modules 105 is not limited to the illustrated example and may vary. In various embodiments, the microphone hole and the speaker hole may be implemented as a single hole. In various embodiments, the third audio module 104 or the fourth audio module 105 may include a piezo speaker in which the speaker hole is omitted.

The sensor module 106 may generate electrical signals or data values corresponding to, for example, the internal operating states or the external environmental states of the electronic device 100. In an embodiment, the sensor module 106 may include an optical sensor positioned inside the electronic device 100 to correspond to the front surface 200A. The optical sensor may include, for example, a proximity sensor or an illuminance sensor. The optical sensor may be aligned with an opening provided in the display 101 (or a display area). External light may reach the optical sensor through the openings in the front plate 210 and the display 101. In various embodiments, an optical sensor may be positioned below the display 101, and may perform a related function in the state in which the position of the optical sensor is not visually differentiated (or exposed). For example, the optical sensor may be positioned on the rear surface of the display 101 (or a display area), or below or beneath the display 101 (or a display area). In various embodiments, the optical sensor may be positioned to be aligned with a recess provided in the rear surface of the display 101 (or a display area). The optical sensor may be disposed to overlap at least a portion of the screen to perform a detection function, without being exposed to the outside. In this case, a partial area of the display 101 that at least partially overlaps the optical sensor may include a pixel structure and/or a wiring structure different from those of other areas. For example, the partial area of the display 101 that at least partially overlaps the optical sensor may have a pixel density different from that of other areas. In various embodiments, a plurality of pixels may not be disposed in the partial area of the display 101 that at least partially overlaps the optical sensor. In various embodiments, the electronic device 100 may include a biometric sensor (e.g., a fingerprint sensor) positioned below the display 101. The biometric sensor may be implemented in an optical type, an electrostatic type, or an ultrasonic type, and the position or number of biometric sensors may vary. The electronic device 100 may further include at least one of various other sensor modules, such as a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

The front camera module 107 may be positioned inside the electronic device 100 to correspond to, for example, the front surface 200A. The plurality of rear camera modules (e.g., the first rear camera module 108A, the second rear camera module 108B, and the third rear camera module 108C) may be positioned inside the electronic device 100 to correspond to, for example, the rear surface 200B. In an embodiment, the plurality of second camera modules 108A, 108B, and 108C may be positioned to correspond to the second rear plate 222. The front camera module 107 and/or the plurality of rear camera modules 108A, 108B, and 108C may include, for example, one or more of lenses, an image sensors, and/or image signal processors. The position or number of front camera modules or rear camera modules is not limited to the illustrated example and may vary.

According to an embodiment, the display 101 (or a display area) may include an opening aligned with the front camera module 107. External light may reach the front camera module 107 through the openings in the front plate 210 and the display 101. In various embodiments, the opening of the display 101 may be provided in the form of a notch depending on the position of the front camera module 107. In various embodiments, the front camera module 107 may be positioned below the display 101 (or a display area), and a related function (e.g., image capturing) may be performed in the state in which the position of the front camera module 107 is not visually differentiated (or exposed). For example, the front camera module 107 may be positioned on the rear surface of the display 101 (or a display area), or below or beneath the display 101 (or a display area), and may include a hidden behind-display-camera (e.g., an under-display-camera (UDC)). In various embodiments, the front camera module 107 may be positioned to be aligned with a recess provided in the rear surface of the display 101 (or a display area). The front camera module 107 may be disposed to overlap at least a portion of the screen to acquire an image of an external subject without being visually exposed to the outside. In this case, a partial area of the display 101 that at least partially overlaps the front camera module 107 may include a pixel structure and/or a wiring structure different from those of other areas. For example, the partial area of the display 101 that at least partially overlaps the front camera module 107 may have a pixel density different from that of other areas. The pixel structure and/or the wiring structure provided in the partial area of the display 101 that at least partially overlaps the front camera module 107 may reduce light loss between the outside and the front camera module 107. In various embodiments, pixels may not be disposed in the partial area of the display 101 that at least partially overlaps the front camera module 107. In various embodiments, the electronic device 100 may further include a light-emitting module (e.g., a light source) positioned inside the electronic device 100 to correspond to the front surface 200A. The light-emitting module may provide, for example, the state information of the electronic device 100 in an optical form. In various embodiments, the light-emitting module may provide a light source that is interlocked with the operation of the front camera module 107. The light-emitting module may include, for example, an LED, an IR LED, or a xenon lamp.

According to an embodiment, the plurality of rear camera modules 108A, 108B, and 108C may have different properties (e.g., angles of view) or functions, and may include, for example, a dual camera or a triple camera. The plurality of rear camera modules 108A, 108B, and 108C may each include a plurality of camera modules including a plurality of lenses having different angles of view. The electronic device 100 may control the camera modules to change the angles of view based on a user's selection. The plurality of rear camera modules 108A, 108B, and 108C may include at least one of a wide-angle camera, a telephoto camera, a color camera, a monochrome camera, or an infrared (IR) camera (e.g., a time of flight (TOF) camera or a structured light camera). In various embodiments, the IR camera may be operated as at least a part of a sensor module. The light-emitting module 109 (e.g., flash) may include at least one light source for a rear camera module 108A, 108B, or 108C. The light-emitting module 109 may include, for example, an LED or a xenon lamp. The plurality of rear camera modules 108A, 108B, and 108C may further include at least one image sensor (not illustrated) and/or at least one image signal processor (not illustrated). Alternatively, the plurality of rear camera modules 108A, 108B, and 108C may include at least a portion of electrical paths (e.g., first to third electrical paths 521 to 523) for electrical connection with the outside (e.g., the first printed circuit board 341 in FIG. 3). A plurality of rear camera modules 108A, 108B, and 108C according to various embodiments of the disclosure are not limited in their configurations.

The input module 110 may include, for example, one or more key input devices. The one or more key input devices may be positioned in, for example, openings provided in side surface 200C. In various embodiments, the electronic device 100 may not include some or all of the key input devices, and the not included key input devices may be implemented as soft keys using the display 101. The position or number of input modules 110 may vary, and in various embodiments, the input modules 110 may each include at least one sensor module.

A first connection terminal module (e.g., a first connector module or a first interface terminal module) 111 may include, for example, a first connector (or a first interface terminal) positioned inside the electronic device 100, and a first connector hole provided in the side surface 200C to correspond to the first connector. The second connection terminal module (e.g., a second connector module or a second interface terminal module) 112 may include, for example, a second connector (or a second interface terminal) positioned inside the electronic device 100; and a second connector hole provided on the side surface 200C corresponding to the second connector. The electronic device 100 may transmit and/or receive power and/or data to and from an external electronic device electrically connected to the first connector or the second connector. In an embodiment, the first connector may include a universal serial bus (USB) connector or a high-definition multimedia interface (HDMI) connector. In an embodiment, the second connector may include a connector for a memory card (e.g., a secure digital memory (SD) card or a subscriber identity module (SIM) card). In various embodiments, the second connector may include an audio connector (e.g., a headphone connector or an earset connector). The position or number of connection terminal modules is not limited to the illustrated example and may vary.

The electronic device 100 may further include various components depending on the provided shape thereof. Although it is impossible to list all of these components since the components are modified diversely depending on the convergence trend of an electronic device 100, components equivalent to the above-mentioned components may be further included an electronic device 100. In various embodiments, specific components may be excluded from the above components or replaced with other components depending on the provided shape of an electronic device.

Figure 3:
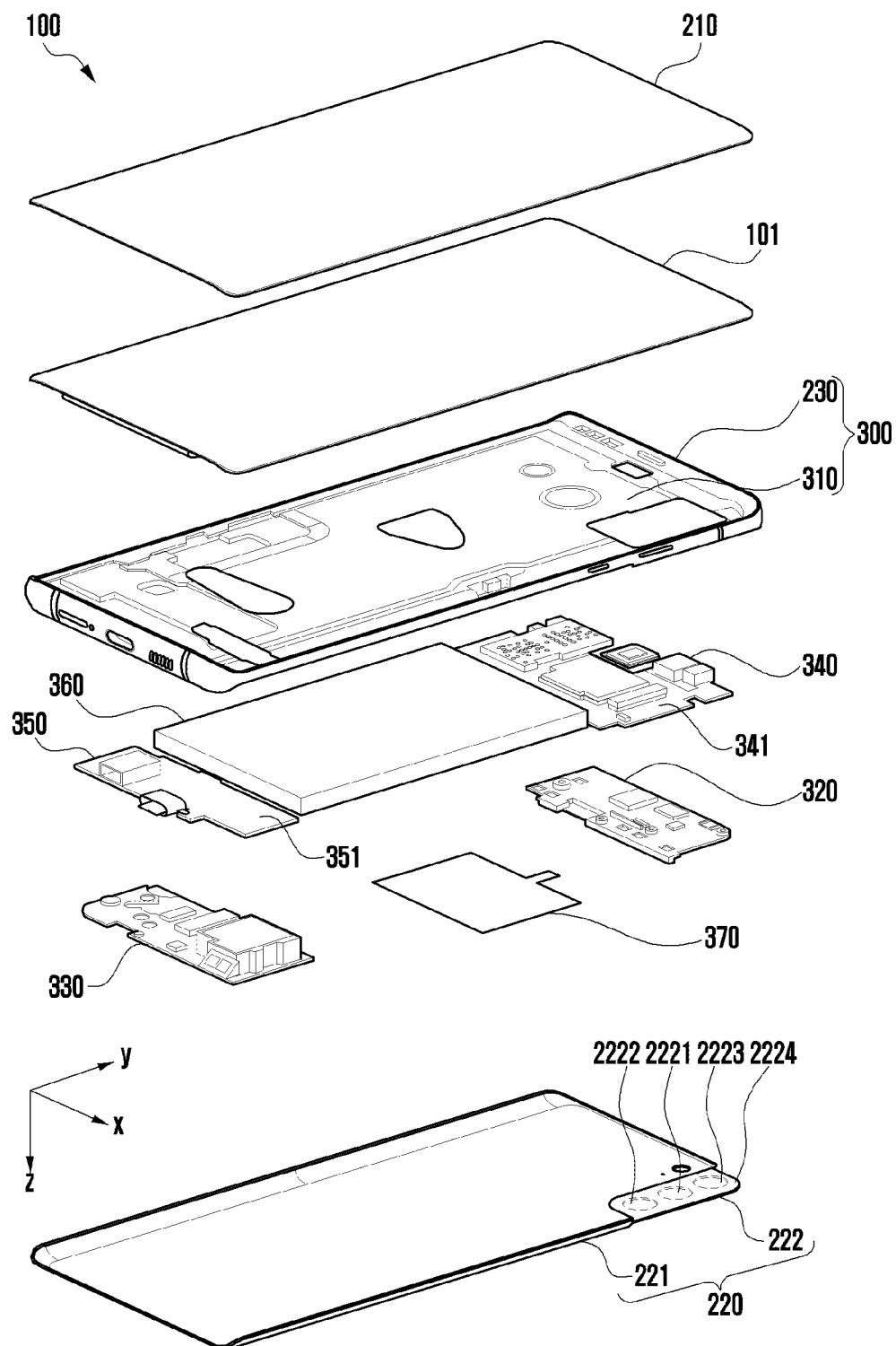
FIGS. 3 and 4 are exploded perspective views of the electronic device according to various embodiments.
Figure 4:
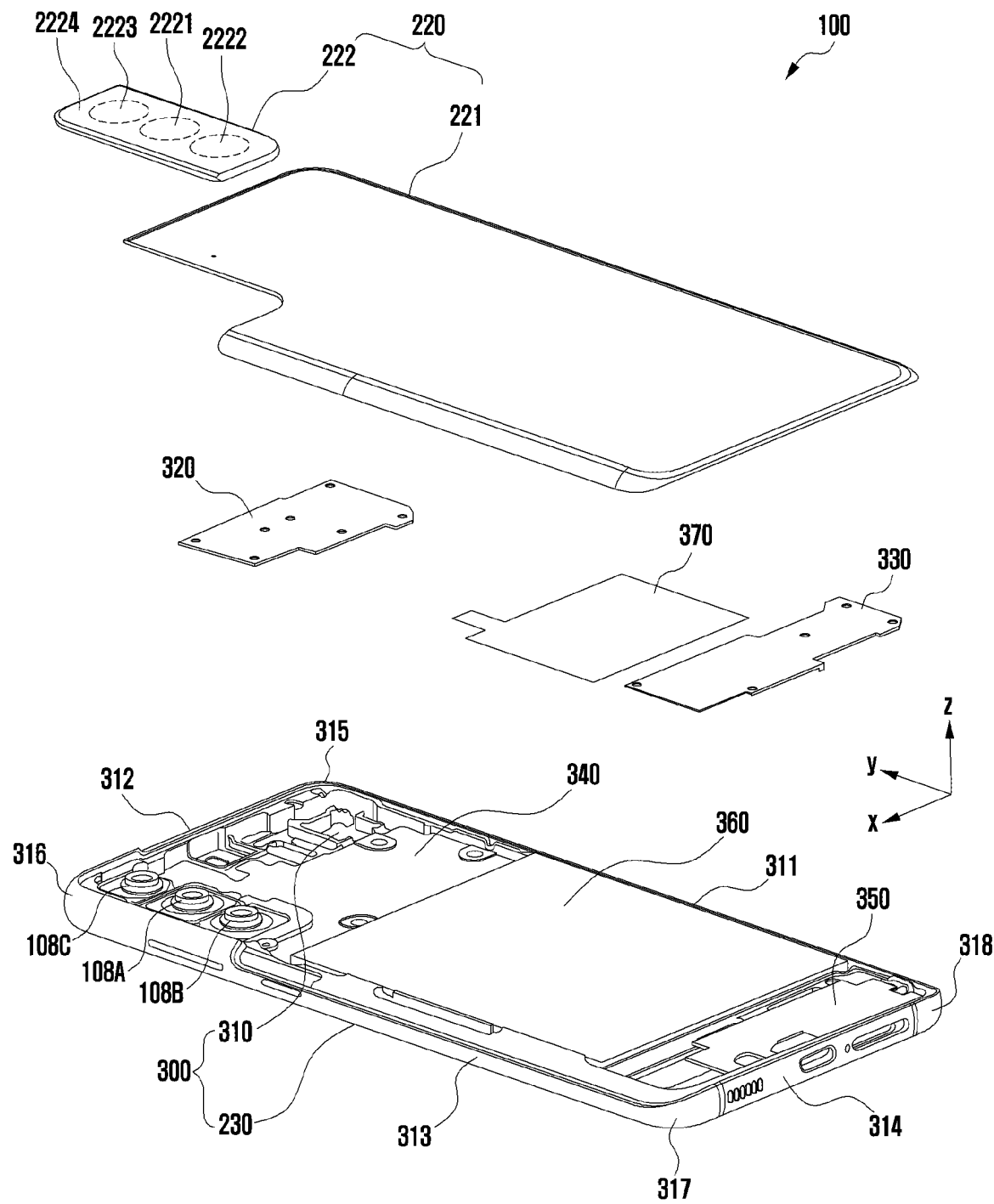

FIGS. 3 and 4 are exploded perspective views of an electronic device 100 according to various embodiments.

Referring to 3 and 4, the electronic device 100 may include a front plate 210, a rear plate 220, a bezel structure 230, a first support member 310, a second support member 320, a third support member 330, a display 101, a first board assembly 340, a second board assembly 350, a battery 360, and/or an antenna structure 370. In various embodiments, at least one of the above-mentioned components may be omitted from the electronic device 100 or other components may be additionally included in the electronic device 100.

According to an embodiment, the bezel structure (or the side member) 230 may include a first bezel portion (or a first side portion) 311, a second bezel portion (or a second side portion) 312, a third bezel portion (or a third side portion) 313, or a fourth bezel portion (or a fourth side portion) 314. The first bezel portion 311 and the third bezel portion 313 may be spaced apart from each other and extend in the y-axis direction in parallel to each other. The second bezel portion 312 may interconnect one end of the first bezel portion 311 and one end of the third bezel portion 313. The fourth bezel portion 314 may interconnect the other end of the first bezel portion 311 and the other end of the third bezel portion 313, and may be spaced apart from the second bezel portion 312 and extend in the x-axis direction in parallel to the second bezel portion 312. A first corner portion 315 in which the first bezel portion 311 and the second bezel portion 312 are connected to each other, a second corner portion 316 in which the second bezel portion 312 and the third bezel portion 313 are connected to each other, a third corner portion 317 in which the third bezel portion 313 and the fourth bezel portion 314 are connected to each other, and/or a fourth corner portion 318 in which the first bezel portion 311 and the fourth bezel portion 314 are connected to each other may be provided in a round shape. The first bezel portion 311 and the third bezel portion 313 may have a first length extending in the x-axis direction, and the second bezel portion 312 and the fourth bezel portion 314 may have a second length extending in the y-axis direction and smaller than the first length. In various embodiments, the first length and the second length may be substantially the same. The first support member 310 may be positioned inside the electronic device 100, and may be connected to the bezel structure 230 or configured integrally with the bezel structure 230. The first support member 310 may be formed of, for example, a metal material and/or a non-metal material (e.g., a polymer). In an embodiment, a conductive portion included in the first support member 310 may serve as an electromagnetic shield for the display 101, the first board assembly 340, and/or the second board assembly 350. The first support member 310 and the bezel structure 230 may be referred to as a front case 300. The first support member 310 is a portion of the front case 300 on which components, such as the display 101, the first board assembly 340, the second board assembly 350, or the battery 360 are disposed, and may contribute to the durability or rigidity (e.g., torsional rigidity) of the electronic device 100. In various embodiments, the first support member 310 may be referred to as a "bracket", a "mounting plate", or a "support structure". In various embodiments, the first support member 310 may be interpreted as a portion of the housing 200 (see FIG. 1).

The display 101 may be positioned, for example, between the first support member 310 and the front plate 210, and may be disposed on one surface of the first support member 310 (e.g., the surface facing the front plate 210). In an embodiment, the display 101 may be coupled to the front plate 210 using an optically transparent adhesive member such as an optical clear adhesive (OCA), an optical clear resin (OCR), or a super view resin (SVR). The first board assembly 340 and the second board assembly 350 may be positioned, for example, between the first support member 310 and the rear plate 220, and may be disposed on the other surface of the first support member 310 (e.g., the surface facing the rear plate 220). The battery 360 may be positioned, for example, between the first support member 310 and the rear plate 220, and may be disposed on the first support member 310.

According to an embodiment, the first board assembly 340 may include a first printed circuit board 341 (e.g., a printed circuit board (PCB) or a printed circuit board assembly (PBA)). The first board assembly 340 may include various electronic components electrically connected to the first printed circuit board 341. The electronic components may be disposed on the first printed circuit board 341 or may be electrically connected to the first printed circuit board 341 via an electrical path such as a cable or a flexible printed circuit board (FPCB). Referring to FIGS. 1 and 2, the above-described electronic components may include, for example, a second microphone included in the second audio module 103, a second speaker included in the fourth audio module 105, a sensor module 106, a front camera module 107, a plurality of rear camera modules 108A, 108B, and 108C, a light-emitting module 109, or an input module 110.

According to an embodiment, the second board assembly 350 may be positioned to be spaced apart from the first board assembly 340 with the battery 360 interposed therebetween when viewed from above the front plate 210 (e.g., when viewed in the +z-axis direction). The second board assembly 350 may include a second printed circuit board 351 electrically connected to the first printed circuit board 341 of the first board assembly 340. The second board assembly 350 may include various electronic components electrically connected to the second printed circuit board 351. The electronic components may be disposed on the second printed circuit board 351 or may be electrically connected to the second printed circuit board 351 via an electrical path such as a cable or an FPCB. Referring to FIGS. 1 and 2, the above-described electronic components may include, for example, a first microphone included in the first audio module 102, a first speaker included in the third audio module 104, a first connector included in the first connection terminal module 111, or a second connector included in the second connection terminal module 112.

According to various embodiments, although not illustrated, the first board assembly 340 or the second board assembly 350 may include a primary PCB (or a main PCB or a master PCB), a secondary PCB (or a slave PCB) disposed to partially overlap the primary PCB, and/or an interposer substrate positioned between the primary PCB and the secondary PCB.

The battery 360 is a device for supplying power to at least one component of the electronic device 100 and may include, for example, a non-rechargeable primary battery, a rechargeable secondary battery, or a fuel cell. The battery 360 may be integrally disposed inside the electronic device 100, or may be detachably disposed on the electronic device 100.

According to an embodiment, the second support member 320 may be positioned between the first support member 310 and the rear plate 220 and may be coupled to the first support member 310 and/or the first board assembly 340 using fastening elements such as screws (or bolts). At least a portion of the first board assembly 340 may be positioned between the first support member 310 and the second support member 320, and the second support member 320 may cover and protect the first board assembly 340. The third support member 330 may be positioned at least partially spaced apart from the second support member 320 with the battery 360 interposed therebetween when viewed from above the rear plate 220 (e.g., when viewed in the −z-axis direction). The third support member 330 may be positioned between the first support member 310 and the rear plate 220 and may be coupled to the first support member 310 and/or the second board assembly 350 using fastening elements such as screws (or bolts). At least a portion of the second board assembly 350 may be positioned between the first support member 310 and the third support member 330, and the third support member 330 may cover and protect the second board assembly 350. The second support member 320 and/or the third support member 330 may be formed of a metal material and/or a non-metal material (e.g., a polymer). In various embodiments, the second support member 320 may serve as an electromagnetic shield for the first board assembly 340, and the third support member 330 may serve as an electromagnetic shield for the second board assembly 350. In various embodiments, the second support member 320 and/or the third support member 330 may be referred to as a rear case. In various embodiments, the second support member 320 and/or the third support member 330 may be interpreted as a portion of the housing 200 (see FIG. 1).

According to various embodiments, a single board assembly including the first board assembly 340 and the second board assembly 350 may be implemented. For example, the single board assembly may include a first portion and a second portion positioned to be spaced apart from each other with the battery 360 interposed therebetween when viewed from above the rear plate 220 (e.g., when viewed in the −z-axis direction), and a third portion extending between the battery 360 and the bezel structure 230 and interconnecting the first portion and the second portion. The third part may be implemented to be substantially rigid. In various embodiments, the third portion may be implemented to be substantially flexible. In various embodiments, a single support member including the second support member 320 and the third support member 330 may be implemented.

According to an embodiment, the second support member 320 (e.g., the rear case) may include a non-conductive member (not illustrated) formed of a non-metallic material (e.g., a polymer), and/or a plurality of conductive patterns (not illustrated) disposed on the non-conductive member. For example, the conductive pattern may be implemented by laser direct structuring (LDS). The LDS may be, for example, a method in which a pattern is drawn (or designed) on a non-conductive member using a laser, and a conductive material such as copper or nickel is plated thereon to form a conductive pattern. The plurality of conductive patterns may be electrically connected to a wireless communication circuit (or a wireless communication module) included in the first board assembly 340 to operate as an antenna radiator. In an embodiment, at least some conductive portions included in the bezel structure 230 may operate as an antenna radiator electrically connected to a wireless communication circuit. The wireless communication circuit may process a transmission signal or a reception signal in at least one selected or predetermined frequency band via the at least one antenna radiator. The selected or predetermined frequency band may include, for example, at least one of a low band (LB) (about 600 MHz to about 1 GHz), a middle band (MB) (about 1 GHz to about 2.3 GHz), a high band (HB) (about 2.3 GHz to about 2.7 GHz), or an ultra-high band (UHB) (about 2.7 GHz to about 6 GHz). The predetermined frequency band may include various other frequency bands.

According to an embodiment, the antenna structure 370 may be at least partially positioned between the battery 360 and the rear plate 220. The antenna structure 370 may be implemented in the form of a film such as an FPCB. The antenna structure 370 may include at least one conductive pattern used as a loop-type radiator. For example, the at least one conductive pattern may include a planar spiral conductive pattern (e.g., a planar coil or a pattern coil). At least one conductive pattern included in the antenna structure 370 may be electrically connected to a wireless communication circuit (or a wireless communication module) included in the first board assembly 340. For example, the at least one conductive pattern may be utilized for short-range wireless communication such as near field communication (NFC). As another example, the at least one conductive pattern may be utilized for magnetic secure transmission (MST) for transmitting and/or receiving a magnetic signal. In various embodiments, at least one conductive pattern included in the antenna structure 370 may be electrically connected to a power transmission/reception circuit included in the first board assembly 340. The power transmission/reception circuit may wirelessly receive power from an external electronic device or wirelessly transmit power to the external electronic device using at least one conductive pattern. The power transmission/reception circuit may include a power management module, for example, a power management integrated circuit (PMIC) or a charger integrated circuit (IC). The power transmission/reception circuit may charge the battery 360 using power wirelessly received using the conductive pattern.

According to an embodiment, although not illustrated, the first rear camera module 108A, the second rear camera module 108B, or the third rear camera module 108C may include an image sensor, a third printed circuit board, a lens assembly, and/or an actuator.

The image sensor may convert light into an electrical signal (or a digital signal). The image sensor may include, for example, a charge coupled device (CCD) image sensor. The third printed circuit board may include a first surface facing the rear plate 220, and a second surface disposed opposite to the second surface and facing the front plate 210. The image sensor may be disposed on the first surface of the third printed circuit board. When viewed from above the rear plate 220 (e.g., when viewed in the −z axis direction), the image sensor may include a light receiving area facing the rear plate 220. The image sensor may generate an electrical signal by detecting external light passing through the lens assembly via the light receiving area. The light receiving area of the image sensor may refer to, for example, a point or a focal plane where light reflected from an external object passes through a plurality of lenses to form a focal point. The electrical signal converted by the image sensor may be provided to a processor (e.g., an application processor (AP), a graphics processing device, or an image signal processor) disposed on the first printed circuit board 341 via a third printed circuit board electrically connected to the first printed circuit board 341 of the first board assembly 340. The first printed circuit board 341 and the third printed circuit board may be electrically connected to each other using an electrical path such as a flexible printed circuit (FPCB). For example, one end of the electrical path may be electrically connected to the third printed circuit board, and the other end of the electrical path may include a connector electrically connected to the first printed circuit board. In various embodiments, a single rigid-flexible printed circuit board (RFPCB) including the third printed circuit board and an electrical path 740 may be implemented. The lens assembly may include a barrel structure and one or more lenses. The barrel structure (or a barrel or a camera housing) may include, for example, a first end portion (or an upper end portion) including a first opening (or a front opening or an upper opening) directed to the second rear plate 220, and a second end portion (or a lower end portion) including a second opening (or a rear opening or a lower opening) positioned opposite to the first opening. The barrel structure may include a wall (e.g., a side wall or a lateral wall) extending from the first end portion to the second end portion. When viewed from above the rear plate 220, the first opening in the first end portion and the second opening in the second end portion may be overlappingly aligned with each other. The second end portion may be coupled to the third printed circuit board. One or more lenses may be positioned in the barrel structure to be spaced apart from the image sensor. The light receiving area of the image sensor may be overlappingly aligned with the one or more lenses when viewed from above the rear plate 220. The barrel structure may include a light shielding material, and external light passing through the second rear plate 222 may pass through the first opening in the first end portion and one or more lenses to reach the light receiving area of the image sensor. The one or more lenses may collect or diverge light reflected from an external object (or a subject) to focus an optical image on a light receiving area of the image sensor. In an embodiment, the first opening in the first end portion may serve as an aperture. For example, the amount of light passing through the one or more lenses may be determined by the first opening in the first end portion. In various embodiments, an additional aperture may be positioned between any two lenses, or between a lens and the image sensor.

The actuator may support, for example, an auto focus (AF) function for enabling image capturing with an accurate focus. The AF function may enable image capturing having an out-of-focus effect. The position of a lens may be adjusted using an actuator (or an AF actuator) to achieve automatic focusing. For example, an optimal focal length (e.g., a distance between one or more lenses and a focal plane) depending on a subject distance may be identified using the actuator. The angle of view may vary depending on the focal length. The actuator may adjust the position of the lens by, for example, an electromagnetic force between a coil and a magnet by applying current to the coil. In an embodiment, the actuator may be implemented in an encoder type or a piezo type. The encoder type or the piezo type may control the position of the lens after determining the position of the lens via a position sensor. In various embodiments, the AF actuator may be implemented based on a voice coil motor type. The voice coil motor type may control the position of a lens by current applied to a coil.

According to various embodiments, the first rear camera module 108A, the second rear camera module 108B, or the third rear camera module 108C may not have an AF function and may not include an actuator. The angle of view of the first rear camera module 108A, the second rear camera module 108B, or the third rear camera module 108C may be set to a wide angle, and the first rear camera module 108A, the second rear camera module 108B, or the third rear camera module 108C may be capable of capturing an image with infinite focus without an AF function.

According to various embodiments, some of the above-mentioned components may be omitted from the first rear camera module 108A, the second rear camera module 108B, or the third rear camera module 108C, or other components may be additionally included in the first rear camera module 108A, the second rear camera module 108B, or the third rear camera module 108C. For example, the first rear camera module 108A, the second rear camera module 108B, or the third rear camera module 108C may include a filter for reducing image noise.

According to an embodiment, the first rear camera module 108A, the second rear camera module 108B, and the third rear camera module 108C may be positioned closer to the third bezel portion 313 than the first bezel portion 311 when viewed from above the rear plate 220 (e.g., when viewed in the −z axis). The first rear camera module 108A, the second rear camera module 108B, and the third rear camera module 108C may be positioned closer to the second corner portion 316 among the first corner portion 315, the second corner portion 316, the third corner portion 317, and the fourth corner portion 318 when viewed from above the rear plate 220. The third rear camera module 108C, the first rear camera module 108A, and the second rear camera module 108B may be arranged in a direction from the second bezel portion 312 toward the fourth bezel portion 314 (e.g., in the −y-axis direction) when viewed from above the rear plate 220, and the first rear camera module 108A may be positioned between the second rear camera module 108B and the third rear camera module 108C.

According to an embodiment, the second rear plate 222 may include a first light transmission area (or a first transparent area) 2221 provided to correspond to the first rear camera module 108A, a second light transmission area (or a second transparent area) 2222 provided to correspond to the second rear camera module 108B, and a third light transmission area (or a third transparent area) 2223 provided to correspond to the third rear camera module 108C. External light may pass through the first light transmission area 2221 to reach the first rear camera module 108A. External light may pass through the second light transmission area 2222 to reach the second rear camera module 108B. External light may pass through the third light transmission area 2223 to reach the third rear camera module 108C. The remaining region 2224 other than the first light transmitting region 2221, the second light transmitting region 2222, and the third light transmitting region 2223 of the second rear plate 222 may be formed to be substantially opaque. For example, the second rear plate 222 may include an opaque material layer (e.g., a light shielding sheet) disposed in an area other than a substantially transparent plate (e.g., a glass plate or a polymer plate), a first light transmission area 2221, a second light transmission area 2222, and a third light transmission area 2223 of the transparent plate. The opaque region 2224 of the second rear plate 222 may correspond to a portion on which an opaque material layer is disposed. The opaque material layer may be disposed on a transparent plate using various methods such as application or printing.

Figure 5:
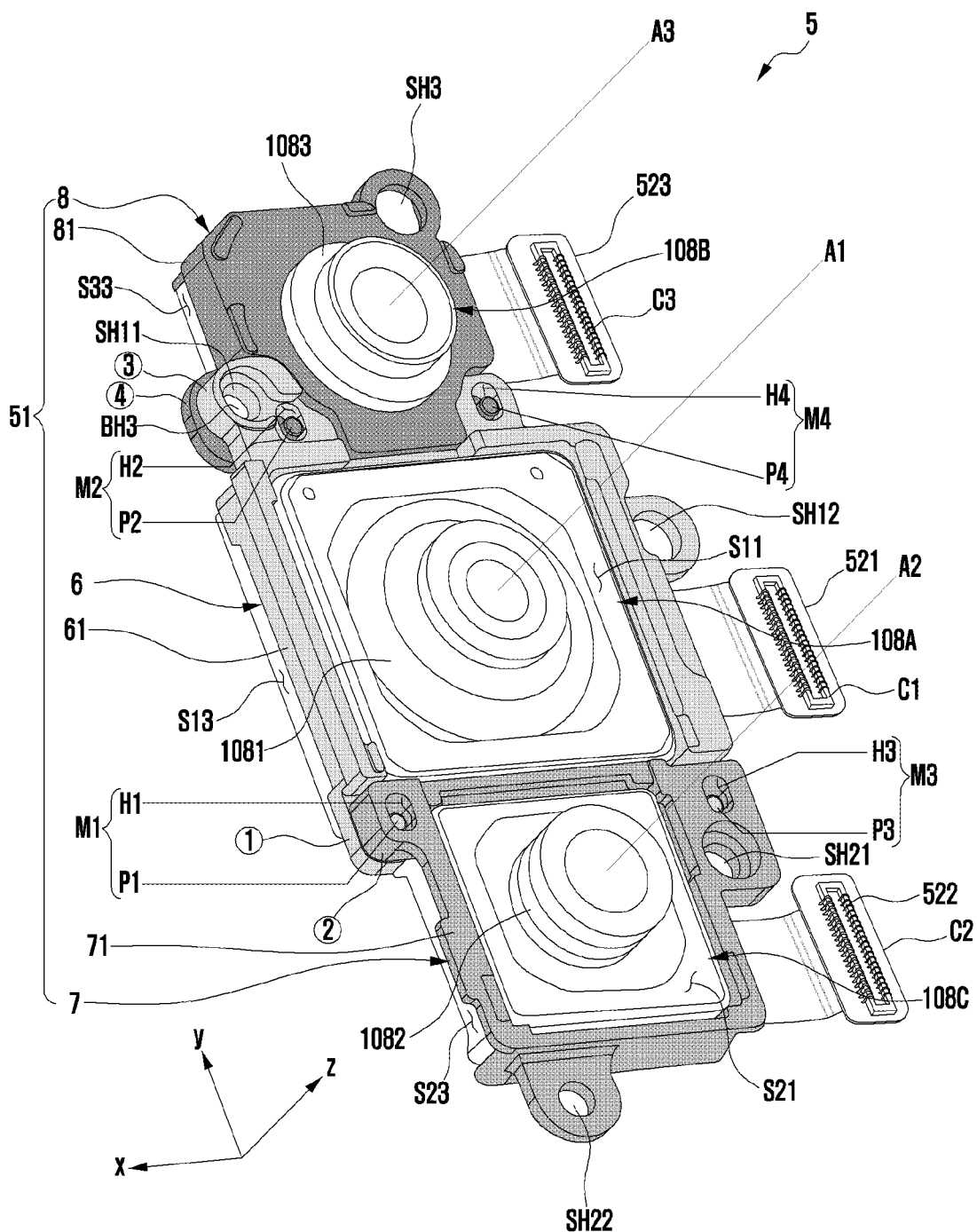
FIG. 5 is a perspective view of a camera module assembly according to various embodiments.

FIG. 5 is a perspective view of a camera module assembly 5 according to various embodiments.

Referring to FIG. 5, the camera module assembly 5 may include a first rear camera module 108A, a second rear camera module 108B, a third rear camera module 108C, a bracket 51, a first electrical path 521, a second electrical path 522, and/or a third electrical path 523.

According to an embodiment, the first rear camera module 108A, the second rear camera module 108B, and the third rear camera module 108C may be positioned inside the electronic device 100 (see FIG. 4) using the bracket 51. The first rear camera module 108A, the second rear camera module 108B, and the third rear camera module 108C may be connected to the first support member 310 of the front case 300 (FIG. 4) using the bracket 51. The bracket 51 may contribute to stable positioning of the first rear camera module 108A, the second rear camera module 108B, and the third rear camera module 108C inside the electronic device 100. The bracket 51 may contribute to durability for the first rear camera module 108A, the second rear camera module 108B, and the third rear camera module 108C. The bracket 51 is an element for stably positioning a camera module inside the electronic device 100, and may referred to by various other terms, such as "support member", "support structure", "connection structure", "connection member", "camera support member", "camera support structure", "camera bracket", or "camera module bracket".

According to an embodiment, when the camera module assembly 5 is disposed on or coupled to the first support member 310 (see FIG. 4) of the front case 300, a first optical center line A1 of the first rear camera module 108A, a second optical center line A2 of the second camera module 108B, and a third optical center line A3 of the third rear camera module 108C may be formed without being twisted (or skewed or deviated). An optical center line may be an imaginary line passing through an optical center passing through the lenses of a camera module through which external light passes without being bent. The first optical center line A1, the second optical center line A2, and the third optical center line A3 may be substantially parallel to the z axis (see FIG. 1, 2, 3, or 4) of the electronic device 100. When viewed from above the rear surface 200B (see FIG. 2) of the electronic device 100 (e.g., in the −z axis direction), the optical center of the first rear camera module 108A, the optical center of the second rear camera module 108B, and the optical center of the third rear camera module 108C may be aligned in the y-axis direction.

According to an embodiment, the bracket (or bracket assembly or bracket structure) 51 may include a first bracket 6, a second bracket 7, and/or a third bracket 8. The first rear camera module 108A may be positioned or disposed on, or coupled to the first bracket 6. The second rear camera module 108B may be positioned or disposed on, or coupled to the second bracket 7. The third rear camera module 108C may be positioned or disposed on, or coupled to the third bracket 8.

According to an embodiment, the first bracket 6 may include a first support portion 61. The first rear camera module 108A may be coupled to the first support portion 61. The first support portion 61 may cover or support the outer surface of the first rear camera module 108A so that the first rear camera module 108A can be stably positioned on the first support portion 61. The exterior of the first rear camera module 108A may include, for example, an upper surface S11 (e.g., the surface oriented in the +z-axis direction in FIG. 5) and a lower surface S12 (e.g., the surface oriented in the −z axis direction in FIG. 5) positioned opposite to each other in the direction of the first optical center line A1, and a side surface (or a lateral surface) S13 interconnecting the upper surface S11 and the lower surface S12. In an embodiment, the first rear camera module 108A may include a first housing structure (or a first exterior member) that at least partially defines the upper surface S11 and the side surface S13, and at least a portion of the lower surface S13 may be defined by a printed circuit board on which an image sensor is disposed. In various embodiments, the first housing structure may be implemented to define at least a portion of the lower surface S13. The lens assembly 1081 may be positioned in the first housing structure, and the lens assembly 1081 or the barrel structure included in the lens assembly 1081 may pass through an opening provided in the upper surface S11 to protrude with respect to the upper surface S11. In various embodiments, the lens assembly 1081 or the barrel structure may be positioned in the first housing structure such that the lens assembly 1081 or the barrel structure does not protrude with respect to the upper surface S11. In an embodiment, the first support portion 61 may cover at least a portion of the side surface S13 of the first rear camera module 108A, and include, for example, a first annular member (e.g., a square annular member). The first rear camera module 108A may be fitted into the opening in the first annular member and positioned on the first support 61. In various embodiments, the first support portion 61 may extend to correspond to the upper surface S11 or the lower surface S12 of the first rear camera module 108A. In various embodiments, the first support portion 61 is not limited to the illustrated example and may be modified into various other shapes capable of stably positioning the first rear camera module 108A, without being limited in its configuration. In various embodiments, the first rear camera module 108A may be provided in other shapes, without being limited to the illustrated examples, and the first support portion 61 may be configured according to the shape of the first rear camera module 108A, without being limited in its configuration. In an embodiment, the first support portion 61 may be coupled to the first rear camera module 108A through snap-fit fastening. For example, the snap-fit fastening to the first rear camera module 108A may include at least one hook structure which is provided in a portion of the first support portion 61 corresponding to the first rear camera module 108A, and at least one hook fastening structure which is provided on the first rear camera module 108A and to which at least one hook structure is capable of being fastened. In various embodiments, the first rear camera module 108A may be coupled to the first support unit 61 using screw fastening (or bolt fastening). The method such as the snap-fit fastening or the screw fastening may enable replacement of the first bracket 6 or the first rear camera module 108A when the replacement is required due to, for example, damage.

According to an embodiment, the second bracket 7 may include a second support portion 71. The second rear camera module 108B may be coupled to the second support portion 71. The second support portion 71 may cover or support the outer surface of the second rear camera module 108B so that the second rear camera module 108B can be stably positioned on the second support portion 71. The exterior of the second rear camera module 108B may include, for example, an upper surface S21 (e.g., the surface oriented in the +z-axis direction in FIG. 5) and a lower surface S22 (see FIG. 7) (e.g., the surface oriented in the −z axis direction in FIG. 5) positioned opposite to each other in the direction of the second optical center line A2, and a side surface (or a lateral surface) S23 interconnecting the upper surface S21 and the lower surface S22. In an embodiment, the second rear camera module 108B may include a second housing structure (or a second exterior member) that at least partially defines the upper surface S21 and the side surface S23, and at least a portion of the lower surface S23 may be defined by a printed circuit board on which an image sensor is disposed. In various embodiments, the second housing structure may be implemented to define at least a portion of the lower surface S23. The lens assembly 1082 may be positioned in the second housing structure, and the lens assembly 1082 or the barrel structure included in the lens assembly 1082 may pass through an opening provided in the upper surface S21 to protrude with respect to the upper surface S21. In various embodiments, the lens assembly 1082 or the barrel structure may be positioned in the second housing structure such that the lens assembly 1082 or the barrel structure does not protrude with respect to the upper surface S21. In an embodiment, the second support portion 71 may cover at least a portion of the side surface S23 of the second rear camera module 108B, and include, for example, a second annular member (e.g., a square annular member). The second rear camera module 108B may be fitted into the opening in the second annular member and positioned on the second support portion 71. In various embodiments, the second support portion 71 may extend to correspond to the upper surface S21 or the lower surface S22 of the second rear camera module 108B. In various embodiments, the second support portion 71 is not limited to the illustrated example and may be modified into various other shapes capable of stably positioning the second rear camera module 108B, without being limited in its configuration. In various embodiments, the second rear camera module 108B may be provided in other shapes, without being limited to the illustrated example, and the second support portion 71 may be configured according to the shape of the second rear camera module 108B, without being limited in its configuration. In an embodiment, the second support portion 71 may be coupled to the second rear camera module 108B through snap-fit fastening. In various embodiments, the second rear camera module 108B may be coupled to the second support portion 71 using screw fastening (or bolt fastening). The method such as the snap-fit fastening or the screw fastening may enable replacement of the second bracket 7 or the second rear camera module 108B when the replacement is required due to, for example, damage.

According to an embodiment, the third bracket 8 may include a third support portion 81. The third rear camera module 108C may be coupled to the third support portion 81. The third support portion 81 may cover or support the outer surface of the third rear camera module 108C so that the third rear camera module 108C can be stably positioned on the third support portion 81. The exterior of the third rear camera module 108C may include, for example, an upper surface (e.g., the surface oriented in the +z-axis direction in FIG. 5) and a lower surface S32 (see FIG. 7) (e.g., the surface oriented in the −z axis direction in FIG. 5) positioned opposite to each other in the direction of the third optical center line A3, and a side surface (or a lateral surface) S33 interconnecting the upper surface and the lower surface S32. In an embodiment, the third rear camera module 108C may include a third housing structure (or a third exterior member) that at least partially defines the upper surface and the side surface S33, and at least a portion of the lower surface S33 may be defined by a printed circuit board on which an image sensor is disposed. In various embodiments, the third housing structure may be implemented to define at least a portion of the lower surface S32. The lens assembly 1083 may be positioned in the third housing structure, and the lens assembly 1083 or the barrel structure included in the lens assembly 1083 may pass through an opening provided in the upper surface of the third housing structure to protrude with respect to the upper surface. In various embodiments, the lens assembly 1083 or the barrel structure may be positioned in the third housing structure such that the lens assembly 1083 or the barrel structure does not protrude with respect to the upper surface of the third housing structure. The third support 81 may include, for example, a shape including a first portion that covers at least a portion of the side surface S33 of the third rear camera module 108C, and a second portion that extends from the first portion of the third rear camera module 108C covers at least a portion of the upper surface of the third rear camera module 108C. The first portion of the third support portion 81 may have, for example, an annular shape that covers at least a portion of the side surface S33 of the third rear camera module 108C. The second portion of the third support 81 may include an opening, and the lens assembly 1083 or the barrel structure may be positioned to protrude with respect to the second portion through the opening in the second portion. In various embodiments, the lens assembly 1083 or the barrel structure may not protrude with respect to the second portion. Due to the first portion and the second portion, the third support portion 81 may have a recess, and the third rear camera module 108C may be fitted into the recess and positioned on the third support portion 81. In various embodiments, the third support portion 81 may extend to correspond to the lower surface S32 of the third rear camera module 108C. In various embodiments, the third support portion 81 is not limited to the illustrated example and may be modified into various other shapes capable of stably positioning the third rear camera module 108C, without being limited in its configuration. In various embodiments, the third rear camera module 108C may be provided in other shapes, without being limited to the illustrated example, and the third support portion 81 may be configured according to the shape of the third rear camera module 108C, without being limited in its configuration. In an embodiment, the third support portion 81 may be coupled to the third rear camera module 108C through snap-fit fastening. In various embodiments, the third rear camera module 108C may be coupled to the third support portion 81 using screw fastening (or bolt fastening). The method such as the snap-fit fastening or the screw fastening may enable replacement of the third bracket 8 or the third rear camera module 108C when the replacement is required due to, for example, damage.

According to an embodiment, the bracket 51 may include a structure capable of adjusting a first mutual positional relationship between the first bracket 6 and the second bracket 7 or a second mutual positional relationship between the first bracket 6 and the third bracket 8. The mutual positional relationship between the two brackets may include, for example, a relative position between the two brackets. The mutual positional relationship (or the relative position) between the first rear camera module 108A positioned on the first bracket 6 and the second rear camera module 108B positioned on the second bracket 7 may vary depending on the first mutual positional relationship (or first relative position) between the first bracket 6 and the second bracket 7. The mutual positional relationship (or the relative position) between the first rear camera module 108A positioned on the first bracket 6 and the third rear camera module 108C positioned on the third bracket 8 may vary depending on the second mutual positional relationship (or second relative position) between the first bracket 6 and the third bracket 8. In an embodiment, the camera module assembly 5 may be positioned in the electronic device 100 in the state in which the first mutual position between the first bracket 6 and the second bracket 7 or the second positional relationship between the first bracket 6 and the third bracket 8 is adjusted to be suitable for bracket arrangement conditions included in the electronic device 100 (see FIG. 2). Referring to FIG. 4 or FIG. 5, the bracket arrangement conditions included in the electronic device 100 may be determined based on, for example, the second rear plate 222 and the first support member 310. The bracket arrangement conditions included in the electronic device 100 may include a mutual positional relationship (or a relative position) among the first light transmission area 2221, the second light transmission area 2222, and the third light transmission area 2223, and the corresponding bracket arrangement structure provided on the first support member 310. The bracket arrangement structure provided on the first support member 310 may include, for example, a seating structure that is capable of stably positioning the bracket 51 on the first support member 310 (e.g., the seating structure 3100 of FIG. 6), and screw fastening portions (e.g., bosses) for supporting screw fastening between the first support member 310 and the bracket 51 based on the seating structure. The seating structure may include, for example, a recess structure or a fitting structure that allows the bracket 51 or the camera module assembly 5 to be stably positioned on the first support member 310 without shaking. The screw fastening portions may be provided, for example, in the seating structure to support screw fastening between the bracket 51 and the seating structure. In various embodiments, the seating structure may be interpreted as including screw fastening portions. Since the seating structure is provided to match the mutual positional relationship among the first bracket 6, the second bracket 7, and the third bracket 8, and the corresponding mutual positional relationship among the first rear camera module 108A, the second rear camera module 108B, and the third rear camera module 108C, the seating structure may have various shapes. In various embodiments, the seating structure may further include a hook structure that supports snap-fit fastening between the bracket 51 and the first support member 310. For example, when the bracket 51 or the camera module assembly 5 is positioned in the seating structure, the at least one hook structure provided in the seating structure may be fastened to at least one hook fastening structure (or engagement structure) provided in the bracket 51. In various embodiments, the bracket 51 may include at least one hook structure, and the seating structure may include at least one corresponding hook fastening structure. The camera module assembly 5 may be used in various electronic devices including different bracket arrangement structures without redesigning brackets (e.g., the components thereof may be commonly used), thereby contributing to reducing the manufacturing costs of the electronic devices. Compared to a single bracket of a comparative example in which it is difficult to adjust the mutual positional relationship among a plurality of rear camera modules, the camera module assembly 5 may improve the degree of design freedom by reducing design restrictions on the second rear plate 222.

According to an embodiment, the bracket 51 may include a first positioning structure M1 and/or a third positioning structure M3 capable of adjusting a first mutual positional relationship (or a first relative position) between the first bracket 6 and the second bracket 7. The first positioning structure M1 and the third positioning structure M3 may be provided based on a structure in which the first bracket 6 and the second bracket 7 are overlappingly slidable with respect to each other. For example, the first bracket 6 may include a first portion ① extending from the first support portion 61, and the second bracket 7 may include a second portion ② extending from the second support portion 71. The first portion ① and the second portion ② may overlap each other when viewed from above the rear surface 200B (see FIG. 2) of the electronic device 100 (e.g., when viewed in the −z-axis direction). When the camera module assembly 5 is positioned on or coupled to the first support member 310 (see FIG. 4) of the front case 300, the first portion ① may face and come into contact with the first support member 310. The first positioning structure M1 may include the first protrusion P1 provided on the first portion ① and the first hole H1 provided in the second portion ②. The first protrusion P1 may be in the form of protruding and extending in the +z-axis direction from one surface of the first portion ① that faces and comes into contact with the second portion ②, and may be inserted into the first hole H1. The first hole H1 may have a greater width than the first protrusion P1, whereby the position of the first protrusion P1 relative to the first hole H1 may be adjusted. In an embodiment, the first protrusion P1 may be a cylindrical protrusion having a circular cross-section, and the first hole H1 may have a greater width in the y-axis direction than the first protrusion P1. The position of the first protrusion P1 relative to the first hole H1 may be adjusted in the y-axis direction. The third positioning structure M3 may be provided in substantially the same manner as the first positioning structure M1. The third positioning structure M3 may include, for example, the third protrusion P3 provided on a portion extending from the first support portion 61 of the first bracket 6, and the third hole H3 provided in a portion extending from the second support portion 71 of the second bracket 7. The third hole H3 may have a greater width in the y-axis direction than the third protrusion P3, and the position of the third protrusion P3 relative to the third hole H3 may be adjusted in the y-axis direction. The bracket 51 may include a first boundary where the first support portion 61 and the second support portion 71 face each other between the first rear camera module 108A and the second rear camera module 108B, the first positioning structure M1 may be positioned on one side of the first boundary, and the third positioning structure M3 may be positioned on the other side of the first boundary. The relative position between the first bracket 6 and the second bracket 7, or the relative position between the first rear camera module 108A positioned on the first bracket 6 and the second rear camera module 108B positioned on the second bracket 7 may be determined based on the position of the first protrusion P1 relative to the first hole H1 and the position of the third protrusion P3 relative to the third hole H3. In an embodiment, the first positioning structure M1 and the third positioning structure M3 may guide and support the second bracket 7 to move stably or smoothly (e.g., translational movement) in the y-axis direction with respect to the first bracket 6.

According to an embodiment, the bracket 51 may include a second positioning structure M2 and/or a fourth positioning structure M4 capable of adjusting a second mutual positional relationship (or a second relative position) between the first bracket 6 and the third bracket 8. The second positioning structure M2 and the fourth positioning structure M4 may be provided based on a structure in which the first bracket 6 and the third bracket 8 are overlappingly slidable with respect to each other. For example, the first bracket 6 may include a third portion ③ extending from the first support portion 61, and the third bracket 8 may include a fourth portion ④ extending from the third support portion 81. The third portion ③ and the fourth portion ④ may overlap each other when viewed from above the rear surface 200B (see FIG. 2) of the electronic device 100 (e.g., when viewed in the −z-axis direction). When the camera module assembly 5 is positioned on or coupled to the first support member 310 (see FIG. 4) of the front case 300, the fourth portion ④ may face and come into contact with the first support member 310. The second positioning structure M2 may include the second protrusion P2 provided on the fourth portion ④ and the second hole H2 provided in the third portion ③. The second protrusion P2 may be in the form of protruding and extending in the +z-axis direction from one surface of the fourth portion ④ that faces and comes into contact with the third portion ③, and may be inserted into the second hole H2. The second hole H2 may have a greater width than the second protrusion P2, whereby the position of the second protrusion P2 relative to the second hole H2 may be adjusted. In an embodiment, the second protrusion P2 may be a cylindrical protrusion having a circular cross-section, and the second hole H2 may have a greater width in the y-axis direction than the second protrusion P2. The position of the second protrusion P2 relative to the second hole H2 may be adjusted in the y-axis direction. The fourth positioning structure M4 may be provided in substantially the same manner as the second positioning structure M2. The fourth positioning structure M4 may include, for example, the fourth protrusion P4 provided on a portion extending from the third support portion 81 of the third bracket 8, and the fourth hole H4 provided in a portion extending from the first support portion 61 of the first bracket 6. The fourth hole H4 may have a greater width in the y-axis direction than the fourth protrusion P4, and the position of the fourth protrusion P4 relative to the fourth hole H4 may be adjusted in the y-axis direction. The bracket 51 may include a second boundary where the first support portion 61 and the third support portion 81 face each other between the first rear camera module 108A and the third rear camera module 108C, the second positioning structure M2 may be positioned on one side of the second boundary, and the fourth positioning structure M4 may be positioned on the other side of the second boundary. The relative position between the first bracket 6 and the third bracket 8, or the relative position between the first rear camera module 108A positioned on the first bracket 6 and the third rear camera module 108C positioned on the third bracket 8 may be determined based on the position of the second protrusion P2 relative to the second hole H2 and the position of the fourth protrusion P4 relative to the fourth hole H4. In an embodiment, the second positioning structure M2 and the fourth positioning structure M4 may guide and support the third bracket 8 to move stably or smoothly (e.g., translational movement) in the y-axis direction with respect to the first bracket 6.

According to various embodiments, the first hole H1 of the first positioning structure M1 may be implemented in the form of a recess into which the first protrusion P1 is inserted, without being limited to the form of the illustrated through hole. The second hole H2 of the second positioning structure M2 may be implemented in the form of a recess into which the second protrusion P2 is inserted, without being limited to the form of the illustrated through hole. The third hole H3 of the third positioning structure M3 may be implemented in the form of a recess into which the third protrusion P3 is inserted, without being limited to the form of the illustrated through hole. The fourth hole H4 of the fourth positioning structure M4 may be implemented in the form of a recess into which the fourth protrusion P4 is inserted, without being limited to the form of the illustrated through hole.

According to various embodiments, the bracket 51 may further include a first separation preventing structure (not illustrated) for preventing/reducing the first protrusion P1 from being separated from the first hole H1. For example, the first protrusion P1 may be modified to include an engagement structure corresponding to the peripheral area of the first hole H1 in the second portion ②). As another example, a separate screw that may be used as an engagement structure may be coupled to the first protrusion P1. A second separation preventing structure that prevents/reduces the second protrusion P2 from being separated from the second hole H2, a third separation preventing structure that prevents/reduces the third protrusion P3 from being separated from the third hole H3, or a fourth separation preventing structure that prevents/reduces the fourth protrusion P4 from being separated from the fourth hole H4 may be implemented in substantially the same manner as the first separation preventing structure.

According to various embodiments, without being limited to the illustrated example, the first positioning structure M1 and the third positioning structure M3 may be modified such that the mutual positional relationship (or a first relative position) between the first bracket 6 and the second bracket 7 is adjustable in at least one direction (e.g., a plurality of directions) perpendicular to the z-axis direction. For example, the first hole H1 corresponding to the first protrusion P1 and the third hole H3 corresponding to the third protrusion P3 may be modified in a form extending in a plurality of directions to enable various relative positions between the first bracket 6 and the second bracket 7. For example, the first hole H1 and the third hole H3 may be modified in a "+" shape, and the mutual positional relationship between the first bracket 6 and the second bracket 7 may be adjustable in the x-axis direction or the y-axis direction. In various embodiments, the first hole H1 and the third hole H3 may include a portion extending in a curved form. In various embodiments, the first positioning structure M1 and the third positioning structure M3 may be modified such that the angle of the second bracket 7 relative to the first bracket 6 is adjustable. In various embodiments, the first protrusion P1 or the third protrusion P3 may be modified in a cylindrical shape having various cross-sectional shapes, without being limited to the illustrated circular cylindrical shape.

According to various embodiments, without being limited to the illustrated example, the second positioning structure M2 and the fourth positioning structure M4 may be modified such that the mutual positional relationship (or a second relative position) between the first bracket 6 and the third bracket 8 is adjustable in at least one direction (e.g., a plurality of directions) perpendicular to the z-axis direction. For example, the second hole H2 corresponding to the second protrusion P2 and the fourth hole H4 corresponding to the fourth protrusion P4 may be modified in a form extending in a plurality of directions to enable various relative positions between the first bracket 6 and the third bracket 8. For example, the second hole H2 and the fourth hole H4 may be modified in a "+" shape, and the mutual positional relationship between the first bracket 6 and the third bracket 8 may be adjustable in the x-axis direction or the y-axis direction. In various embodiments, the second hole H2 and the fourth hole H4 may include a portion extending in a curved form. In various embodiments, the first positioning structure M1 and the third positioning structure M3 may be modified such that the angle of the third bracket 8 relative to the first bracket 6 is adjustable. In various embodiments, the second protrusion P2 or the fourth protrusion P4 may be modified in a cylindrical shape having various cross-sectional shapes, without being limited to the illustrated circular cylindrical shape.

According to an embodiment, the first bracket 6 may include a plurality of first screw holes (or a plurality of first screw fastening holes) SH11 and SH12. The plurality of first screw holes SH11 and SH12 may be provided, for example, in a portion extending from the first support portion 61. The plurality of first screw holes SH11 and SH12 may be used to couple the first bracket 6 to the first support member 310 (see FIG. 4) of the front case 300 using screws (or bolts). In an embodiment, one first screw hole SH11 may be provided in the third portion ③ for the second positioning structure M2. The position or number of first screw holes is not limited to the illustrated example and may vary. In various embodiments, at least one of the plurality of first screw holes SH11 and SH12 may be provided in the first support portion 61.

According to an embodiment, the second bracket 7 may include a plurality of second screw holes (or a plurality of second screw fastening holes) SH21 and SH22. The plurality of second screw holes SH21 and SH22 may be provided, for example, in a portion extending from the second support portion 71. The plurality of second screw holes SH21 and SH22 may be used to couple the second bracket 7 to the first support member 310 (see FIG. 4) of the front case 300 using screws (or bolts). In an embodiment, one second screw hole SH21 may be provided in a portion of the second bracket 7 including the third hole H3 for the third positioning structure M3. The position or number of second screw holes is not limited to the illustrated example and may vary. In various embodiments, at least one of the plurality of second screw holes SH21 and SH22 may be provided in the second support portion 71.

According to an embodiment, the third bracket 8 may include a third screw hole (or a third screw fastening hole) SH3 and/or a boss hole (or a boss fastening hole) BH3. The third screw hole SH3 may be provided, for example, in a portion extending from the third support portion 81. The third screw hole SH3 may be used to couple the third bracket 8 to the first support member 310 (see FIG. 4) of the front case 300 using screws (or bolts). The position or number of third screw holes is not limited to the illustrated example and may vary. In various embodiments, the third screw hole may be provided in the third support portion 81.

According to an embodiment, a screw fastening portion (e.g., a boss) B (see FIG. 6) provided in the first support member 310 may be inserted into the boss hole BH3. The screw fastening portion B may be fitted into the boss hole BH3, and may include a hole structure including female threads engageable being with male threads of a screw. One first screw hole SH11 and the boss hole BH3 may be aligned or overlap when viewed from above of the rear surface 200B (see FIG. 2) of the electronic device 100 (e.g., when viewed in the −z axis direction). The first screw hole SH11 may be provided in the third portion ③ of the second positioning structure M2, and the boss hole BH3 may be provided in the fourth portion ④ of the second positioning structure M2. The first bracket 6 and the third bracket 8 may be coupled together to the first support member 310 (see FIG. 4) of the front case 300 using a screw corresponding to the first screw hole SH11 and the boss hole BH3. In various embodiments, the fastening structure like that including the first screw hole SH11 and the boss hole BH3 overlapping each other to correspond to a screw may be provided in the first positioning structure M1 or the third positioning structure M3 related to the first bracket 6 and the second bracket 7, or the fourth positioning structure M4 related to the first bracket 6 and the third bracket 8.

According to various embodiments, in accordance with the seating structure (e.g., the seating structure 3100 in FIG. 6) provided on the first support member 310 (see FIG. 4) and the screw fastening portions (e.g., bosses) based on the seating structure, the mutual positional relationship between the first bracket 6 and the second bracket 7 or the mutual positional relationship between the first bracket 6 and the third bracket 8 is adjustable in the z-axis direction.

According to an embodiment, the first electrical path 521 may electrically interconnect the first rear camera module 108A and the first printed circuit board 341 (see FIG. 3 or FIG. 4). For example, one end of the first electrical path 521 may be electrically connected to the first rear camera module 108A (e.g., the third printed circuit board on which an image sensor is disposed), and the other end of the first electrical path 521 may include a first connector C1 for electrical connection with the first printed circuit board 341. The first electrical path 521 may include, for example, a flexible printed circuit board (FPCB). In various embodiments, the first rear camera module 108A may be interpreted as including the first electrical path 521.

According to an embodiment, the second electrical path 522 may electrically interconnect the second rear camera module 108B and the first printed circuit board 341 (see FIG. 3 or FIG. 4). For example, one end of the second electrical path 522 may be electrically connected to the second rear camera module 108B (e.g., the third printed circuit board on which an image sensor is disposed), and the other end of the second electrical path 522 may include a second connector C2 for electrical connection with the first printed circuit board 341. The second electrical path 522 may include, for example, a flexible printed circuit board (FPCB). In various embodiments, the second rear camera module 108B may be defined as including the second electrical path 522.

According to an embodiment, the third electrical path 523 may electrically interconnect the third rear camera module 108C and the first printed circuit board 341 (see FIG. 3 or FIG. 4). For example, one end of the third electrical path 523 may be electrically connected to the third rear camera module 108C (e.g., the third printed circuit board on which an image sensor is disposed), and the other end of the third electrical path 523 may include a third connector C3 for electrical connection with the first printed circuit board 341. The third electrical path 523 may include, for example, a flexible printed circuit board (FPCB). In various embodiments, the third rear camera module 108C may be defined as including the third electrical path 523.

According to an embodiment, the first bracket 6, the second bracket 7, or the third bracket 8 may include a metal material. The first bracket 6, the second bracket 7, or the third bracket 8 may include, for example, titanium, an amorphous alloy, a metal-ceramic composite material (e.g., cermet), or stainless steel. The first bracket 6, the second bracket 7, or the third bracket 8 may include, for example, magnesium, a magnesium alloy, aluminum, an aluminum alloy, a zinc alloy, or a copper alloy.

According to various embodiments, the first bracket 6 including a metal material may reduce the electromagnetic influence (e.g., electromagnetic interference (EMI)) of noise introduced from the outside of the electronic device 100 (see FIG. 1) or other electronic components on the first rear camera module 108A. The first bracket 6 including a metal material may reduce the electromagnetic influence (e.g., EMI) of the first rear camera module 108A on other electronic components. In various embodiments, the first bracket 6 including a metal material may be electrically connected to a ground (e.g., a ground plane or a ground layer) included in the first printed circuit board 341 (see FIG. 3). The first bracket 6 electrically connected to the ground may serve as a ground structure for reducing electromagnetic influence (e.g., EMI) on the first rear camera module 108A. In various embodiments, the first bracket 6 may reduce malfunction or electrical damage of the first rear camera module 108A due to static electricity introduced into the electronic device 100 through electrostatic discharge (ESD). For example, static electricity may be discharged from various external objects, such as a human body. In an embodiment, at least a portion of the second rear plate 222 (see FIG. 3 or FIG. 4) except for the first light transmission area 2221, the second light transmission area 2222, and the third light transmission area 2223 may be provided as a conductive area of a metallic material. When static electricity discharged from an external object is introduced into a peripheral portion adjacent to the first light transmission area 2221 among the conductive areas of the rear plate 222, the static electricity may be guided to the first support portion 61 of the first bracket 6 on which the first rear camera module 108A is positioned. The static electricity guided to the first support portion 61 may flow to the ground of the first printed circuit board 341 and may be absorbed to the ground, thereby reducing malfunction or electrical damage of the first rear camera module 108A due to the static electricity. In an embodiment, the height at which at least a portion of the first support portion 61 extends in the +z-axis direction may be provided such that it is possible to secure a distance in which static electricity can be guided from a peripheral portion of the conductive area of the rear plate 222 adjacent to the first light transmission area 2221 to the first support portion 61.

According to various embodiments, the second bracket 7 including a metal material may reduce the electromagnetic influence (e.g., EMI) of noise introduced from the outside of the electronic device 100 (see FIG. 1) or other electronic components on the second rear camera module 108B. The second bracket 7 including a metal material may reduce the electromagnetic influence (e.g., EMI) of the second rear camera module 108B on other electronic components. In various embodiments, the second bracket 7 including a metal material may be electrically connected to a ground (e.g., a ground plane or a ground layer) included in the first printed circuit board 341 (see FIG. 3). The second bracket 7 electrically connected to the ground may serve as a ground structure for reducing electromagnetic influence (e.g., EMI) on the second rear camera module 108B. In various embodiments, the second bracket 7 may reduce malfunction or electrical damage of the second rear camera module 108B due to static electricity introduced into the electronic device 100 through electrostatic discharge (ESD). When static electricity discharged from an external object is introduced into a peripheral portion adjacent to the second light transmission area 2222 among the conductive areas of the rear plate 222, the static electricity may be guided to the second support portion 71 of the second bracket 7 on which the second rear camera module 108B is positioned. The static electricity guided to the second support portion 71 may flow to the ground of the first printed circuit board 341 and may be absorbed to the ground, thereby reducing malfunction or electrical damage of the second rear camera module 108B due to the static electricity. In an embodiment, the height at which at least a portion of the second support portion 71 extends in the +z-axis direction may be provided such that it is possible to secure a distance in which static electricity can be guided from a peripheral portion of the conductive area of the rear plate 222 adjacent to the second light transmission area 2222 to the second support portion 71.

According to various embodiments, the second bracket 8 including a metal material may reduce the electromagnetic influence (e.g., EMI) of noise introduced from the outside of the electronic device 100 (see FIG. 1) or other electronic components on the third rear camera module 108C. The third bracket 8 including a metal material may reduce the electromagnetic influence (e.g., EMI) of the third rear camera module 108C on other electronic components. In various embodiments, the third bracket 8 including a metal material may be electrically connected to a ground (e.g., a ground plane or a ground layer) included in the first printed circuit board 341 (see FIG. 3). The third bracket 8 electrically connected to the ground may serve as a ground structure for reducing electromagnetic influence (e.g., EMI) on the third rear camera module 108C. In various embodiments, the third bracket 8 may reduce malfunction or electrical damage of the third rear camera module 108C due to static electricity introduced into the electronic device 100 through electrostatic discharge (ESD). When static electricity discharged from an external object is introduced into a peripheral portion adjacent to the third light transmission area 2223 among the conductive areas of the rear plate 222, the static electricity may be guided to the third support portion 81 of the third bracket 8 on which the third rear camera module 108C is positioned. The static electricity guided to the third support portion 81 may flow to the ground of the first printed circuit board 341 and may be absorbed to the ground, thereby reducing malfunction or electrical damage of the third rear camera module 108C due to the static electricity. In an embodiment, the height at which at least a portion of the third support portion 81 extends in the +z-axis direction may be provided such that it is possible to secure a distance in which static electricity can be guided from a peripheral portion of the conductive area of the rear plate 222 adjacent to the third light transmission area 2223 to the third support portion 81.

According to various embodiments, the first bracket 6, the second bracket 7, or the third bracket 8 may include various non-metal polymer materials such as an engineering plastic (e.g., polycarbonate (PC) or poly methyl methacrylate (PMMA)). As another example, the first bracket 6, the second bracket 7, or the third bracket 8 may include an engineering plastic material mixed with various reinforcing materials such as glass fiber or carbon fiber (e.g., fiber-reinforced plastic (FRP)).

Figure 6:
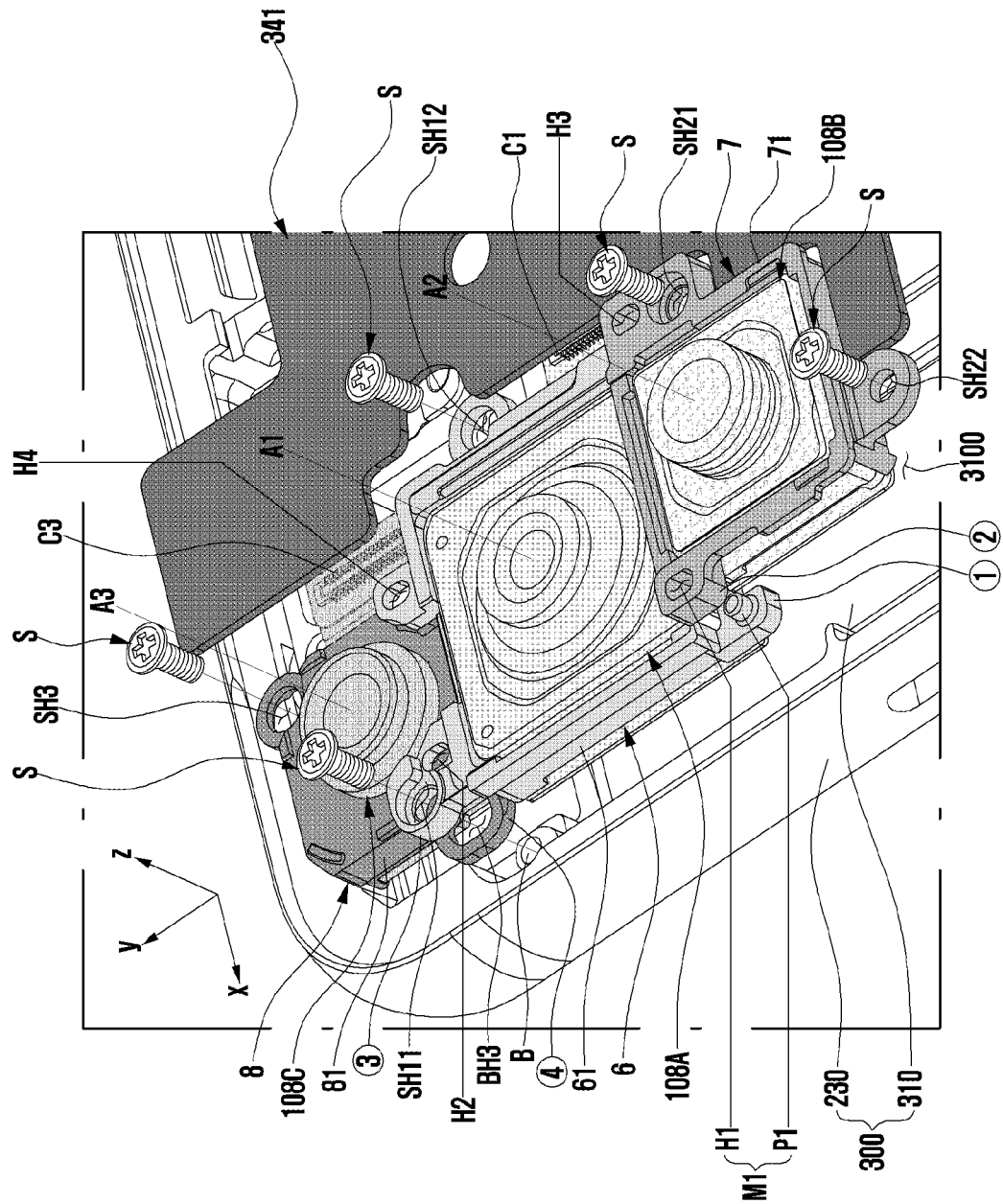
FIG. 6 is an exploded perspective view of a portion of an electronic device according to various embodiments.
Figure 7:
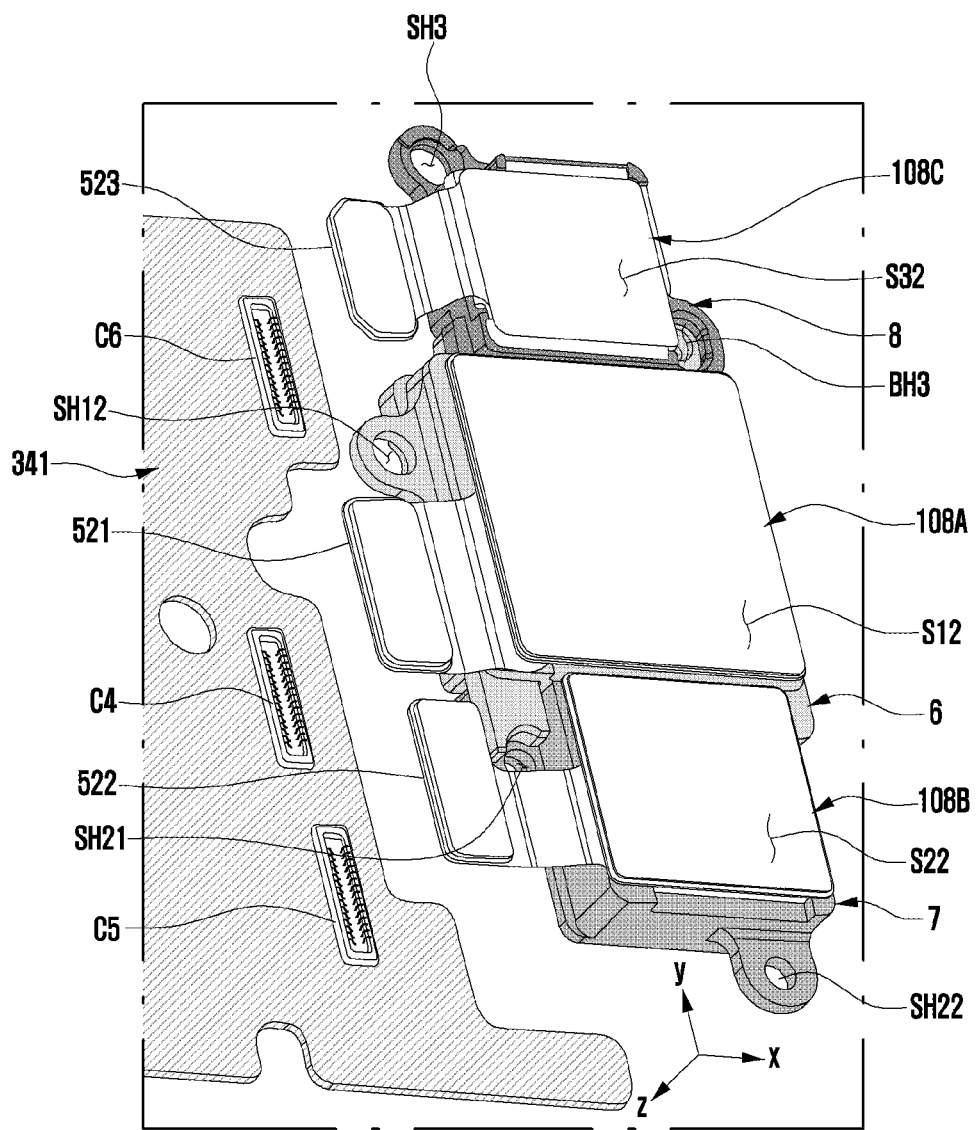
FIG. 7 is a perspective view illustrating a first rear camera module, a second rear camera module, a third rear camera module, a first bracket, a second bracket, a third bracket, and a first printed circuit board according to various embodiments.
Figure 8:
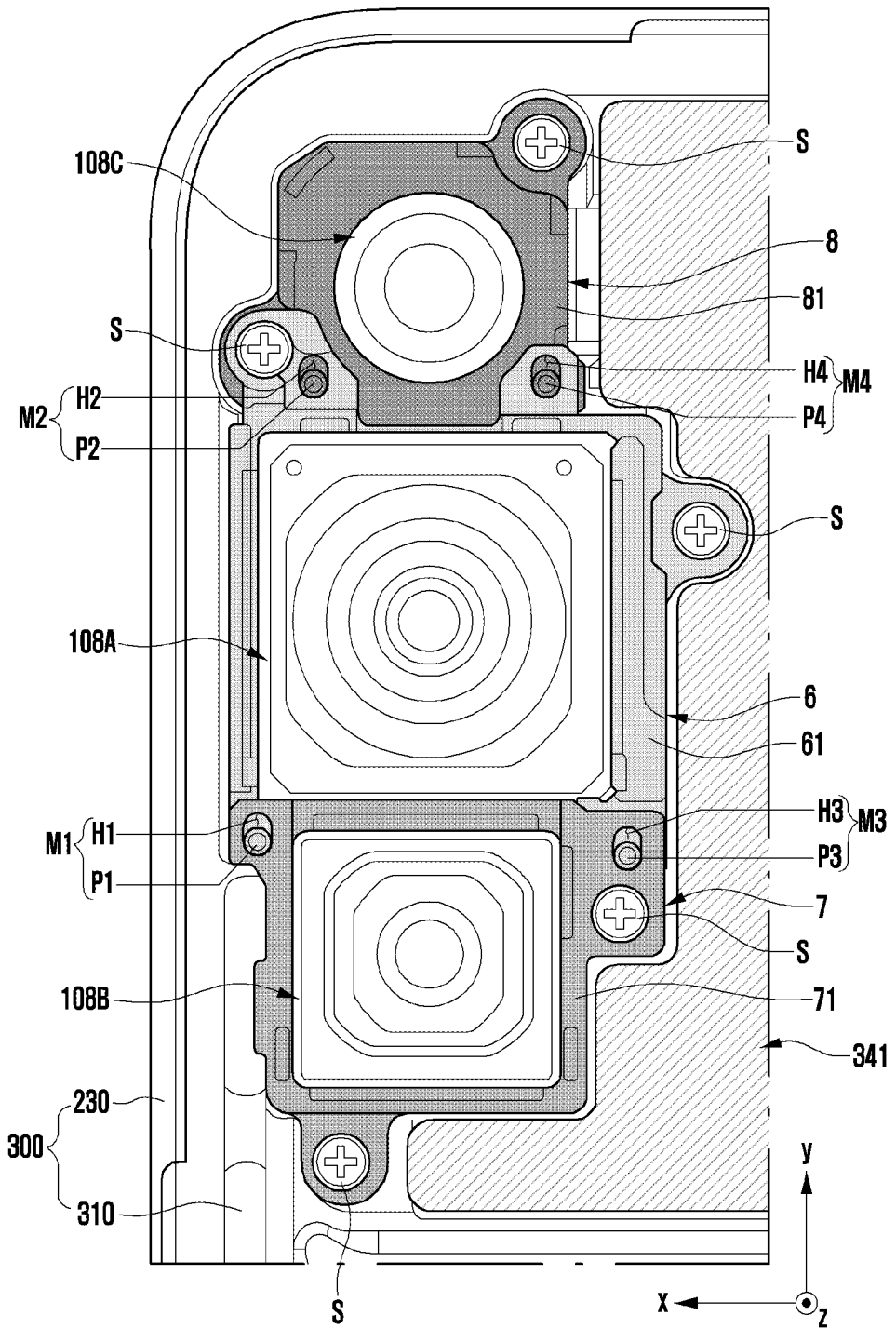
FIG. 8 is a diagram illustrating a portion of an electronic device when viewed from above the rear surface of the electronic device according to various embodiments.

FIG. 6 is an exploded perspective view of a portion of an electronic device 100 according to various embodiments. FIG. 7 is a perspective view illustrating a first rear camera module 108A, a second rear camera module 108B, a third rear camera module 108C, a first bracket 6, a second bracket 7, a third bracket 8, and a first printed circuit board 341 according to various embodiments. FIG. 8 is a diagram illustrating a portion of the electronic device 100 when viewed from above the rear surface 200B (see FIG. 2) of the electronic device 100 according to various embodiments (e.g., when viewed in the −z axis direction).

Referring to FIGS. 6, 7, and 8, the electronic device 100 may include a first rear camera module 108A, a second rear camera module 108B, a third rear camera module 108C, a first bracket 6, a second bracket 7, a third bracket 8, a front case 300, a plurality of screws (or a plurality of bolts) S, and/or a first printed circuit board 341. A first mutual positioning relationship (or a first relative position) between the first bracket 6 and the second bracket 7 may be adjusted using the first positioning structure M1 and the third positioning structure M3, a second mutual positional relationship (or a first relative position) between the first bracket 6 and the third bracket 8 may be adjusted using the second positioning structure M2 and the fourth positioning structure M4, and the first bracket 6, the second bracket 7, and the third bracket 8 may be disposed on or coupled to the first support member 310 of the front case 300 using the plurality of screws S. The shapes of the plurality of screws S may be substantially the same. Although the plurality of screws are denoted by the same reference numeral "S", in various embodiments, some of the plurality of screws may have at least partially different shapes from the other ones. The screws may each include a head portion and a shaft portion extending from the head portion and including male threads. The shapes of the screws may each include, for example, a height or diameter of the head portion, a length of the shaft portion (e.g., a bolt length), a length of the male threads, or a shape of the male threads. The first printed circuit board 341 may include a fourth connector C4, a fifth connector C5, and a sixth connector C6 disposed on one surface facing the first support member 310 (see FIG. 6). The first connector C1 (see FIG. 5 or FIG. 6) of the first electrical path 521 may be electrically connected to the fourth connector C4. The second connector C2 (see FIG. 5) of the second electrical path 522 may be electrically connected to the fifth connector C5. The third connector C3 (see FIG. 5 or FIG. 6) of the third electrical path 523 may be electrically connected to the sixth connector C6. The first bracket 6, the second bracket 7, and/or the third bracket 8, may not overlap the first printed circuit board 341 when viewed from above the rear surface 200B (see FIG. 2) of the electronic device 100 (e.g., when viewed in the −z axis direction).

According to an embodiment, the first support member 310 may include a plurality of screw fastening portions provided to correspond to the plurality of screws S. The screw fastening portions may each include, for example, a hole structure including female threads engageable with male threads of the screws.

According to an embodiment, the first positioning structure M1 and the third positioning structure M3 may be implemented to reduce a height difference between the first support portion 61 of the first bracket 6 and the second support portion 71 of the second bracket 7 or between the first rear camera module 108A and the second rear camera module 108B in the +z-axis direction or the −z-axis direction. For example, the first portion ① of the first bracket 6 may extend from a position of the first support portion 61 closer to the first support member 310 than the rear plate 222 (FIG. 3 or FIG. 4), and the second portion ② of the second bracket 7 may extend from a position of the second support portions 71 closer to the rear plate 222 than the first support member 310. The third positioning structure M3 may be configured in substantially the same manner as the first portion ① and the second ② of the first positioning structure M1.

According to an embodiment, the second positioning structure M2 and the fourth positioning structure M4 may be implemented to reduce a height difference between the first support portion 61 of the first bracket 6 and the third support portion 81 of the third bracket 8 or between the first rear camera module 108A and the third rear camera module 108C in the +z-axis direction or the −z-axis direction. For example, the third portion ③ of the first bracket 6 may extend from a position of the first support portion 61 closer to the rear plate 222 (FIG. 3 or FIG. 4) than the first support member 310, and the fourth portion ④ of the third bracket 8 may extend from a position of the second support portion 71 closer to the first support member 310 than the rear plate 222. The fourth positioning structure M4 may be configured in substantially the same manner as the third portion ③ and the fourth portion ④ of the second positioning structure M2.

Figure 9:
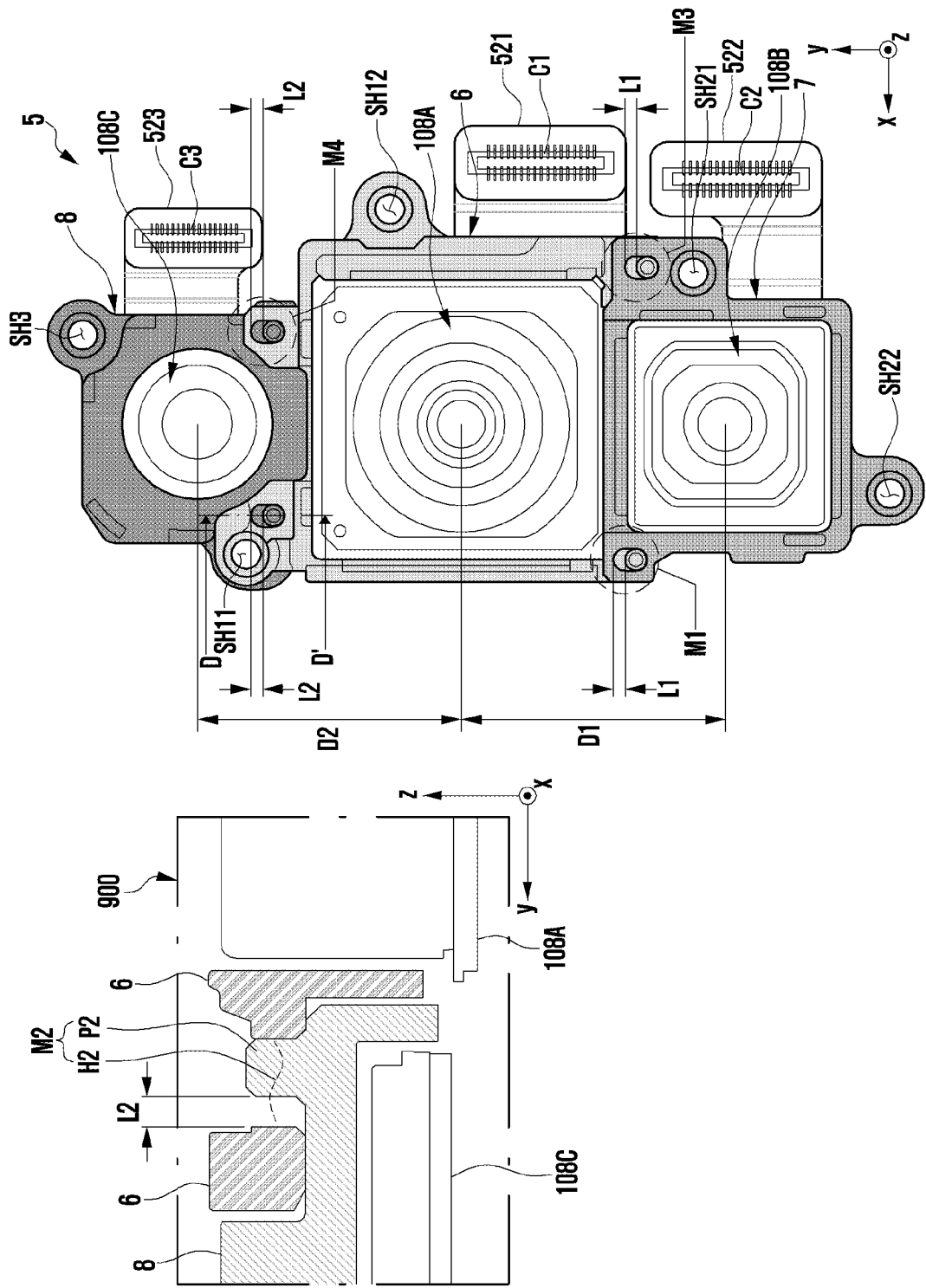
FIG. 9 is a diagram illustrating a camera module assembly and a cross-sectional view of the camera module assembly taken along line D-D' according to various embodiments.
Figure 10:
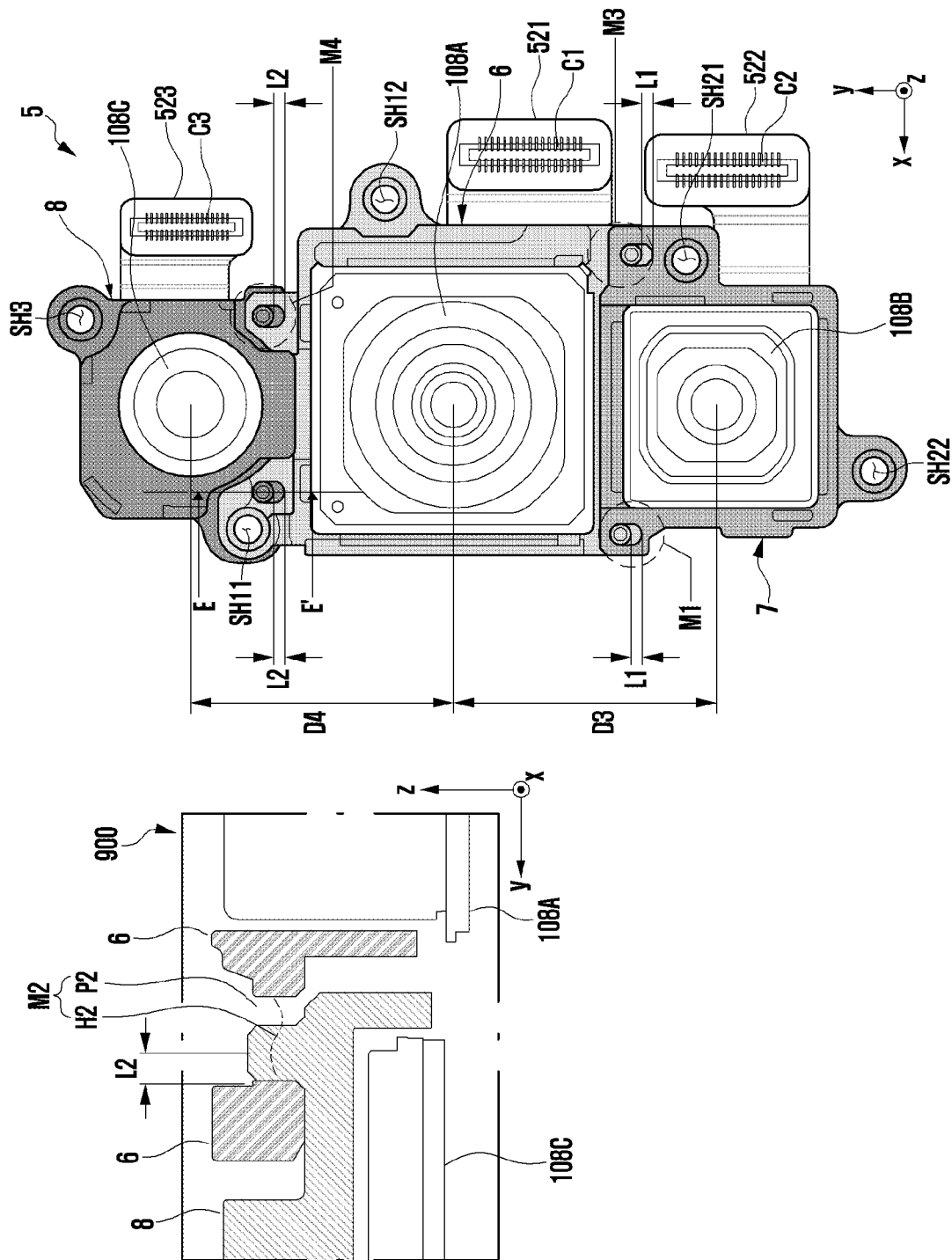
FIG. 10 is a diagram illustrating a camera module assembly and a cross-sectional view of the camera module assembly taken along line E-E' according to various embodiments.

FIG. 9 is a diagram illustrating a camera module assembly 5 and a cross-sectional view (900) of the camera module assembly 5 taken along line D-D' according to various embodiments. FIG. 10 is a diagram illustrating a camera module assembly 5 and a cross-sectional view (1000) of the camera module assembly 5 taken along line D-D' according to various embodiments.

FIG. 9 illustrates, for example, a state in which the distance between the first optical center of the first rear camera module 108A and the second optical center of the second rear camera module 108B is adjusted to a first distance D1, which is the minimum in the y-axis direction, using the first positioning structure M1 and the third positioning structure M3. FIG. 9 illustrates, for example, a state in which the distance between the first optical center of the first rear camera module 108A and the third optical center of the third rear camera module 108C is adjusted to a second distance D2, which is the minimum in the y-axis direction, using the second positioning structure M2 and the fourth positioning structure M4. FIG. 10 illustrates, for example, a state in which the distance between the first optical center of the first rear camera module 108A and the second optical center of the second rear camera module 108B is adjusted to a third distance D3, which is the maximum in the y-axis direction, using the first positioning structure M1 and the third positioning structure M3. FIG. 10 illustrates, for example, a state in which the distance between the first optical center of the first rear camera module 108A and the third optical center of the third rear camera module 108C is adjusted to a fourth distance D4, which is the maximum in the y-axis direction, using the second positioning structure M2 and the fourth positioning structure M4. Without being limited to the example illustrated in FIG. 9 or FIG. 10, the distance between the first optical center of the first rear camera module 108A and the second optical center of the second rear camera module 108B in the y-axis direction may be variously provided within a range between the first distance D1, which is the minimum value, and the third distance D3, which is the maximum value, using the first positioning structure M1 and the third positioning structure M3. The first difference L1 between the first distance D1 and the third distance D3 may correspond to a range in which the first protrusion P1 is displaceable in the first hole H1 in the y-axis direction, or a range in which the third protrusion P3 is displaceable in the third hole H3 in the y-axis direction. Without being limited to the example illustrated in FIG. 9 or FIG. 10, the distance between the first optical center of the first rear camera module 108A and the third optical center of the third rear camera module 108C in the y-axis direction may be variously provided within a range between the second distance D2, which is the minimum value, and the fourth distance D4, which is the maximum value, using the second positioning structure M2 and the fourth positioning structure M4. The second difference L2 between the second distance D2 and the fourth distance D4 may correspond to a range in which the second protrusion P2 is displaceable in the second hole H2 in the y-axis direction, or a range in which the fourth protrusion P4 is displaceable in the fourth hole H4 in the y-axis direction.

According to an embodiment, as in the example of FIG. 9 or the example of FIG. 10, the camera module assembly 5 may be positioned in the corresponding electronic device in the state in which the mutual positional relationship among the first bracket 6, the second bracket 7, and the third bracket 8 is adjusted. For example, a first electronic device (e.g., the electronic device 100 of FIG. 1) including the camera module assembly 5 according to the example of FIG. 9 may include a first bracket arrangement condition. As another example, a second electronic device including the camera module assembly 5 according to the example of FIG. 10 may include a second bracket arrangement condition. Referring to FIG. 4, the first bracket arrangement condition included in a first electronic device (e.g., the electronic device 100 in FIG. 4) may include, for example, a mutual positional relationship among the first light transmission area 2221, the second light transmission area 2222, and the third light transmission area 2223, and the corresponding bracket arrangement structure provided on the first support member 310. The bracket arrangement structure provided on the first support member 310 may include, for example, a seating structure that is capable of stably positioning the camera module assembly 5 on the first support member 310 (e.g., the seating structure 3100 in FIG. 6), and screw fastening portions (e.g., bosses) for supporting screw fastening (or bolt fastening) between the first support member 310 and the camera module assembly 5 based on the seating structure. The second bracket arrangement condition included in the second electronic device may be different from the first bracket arrangement condition to correspond to the camera module assembly 5 according to the example of FIG. 10.

Figure 11:
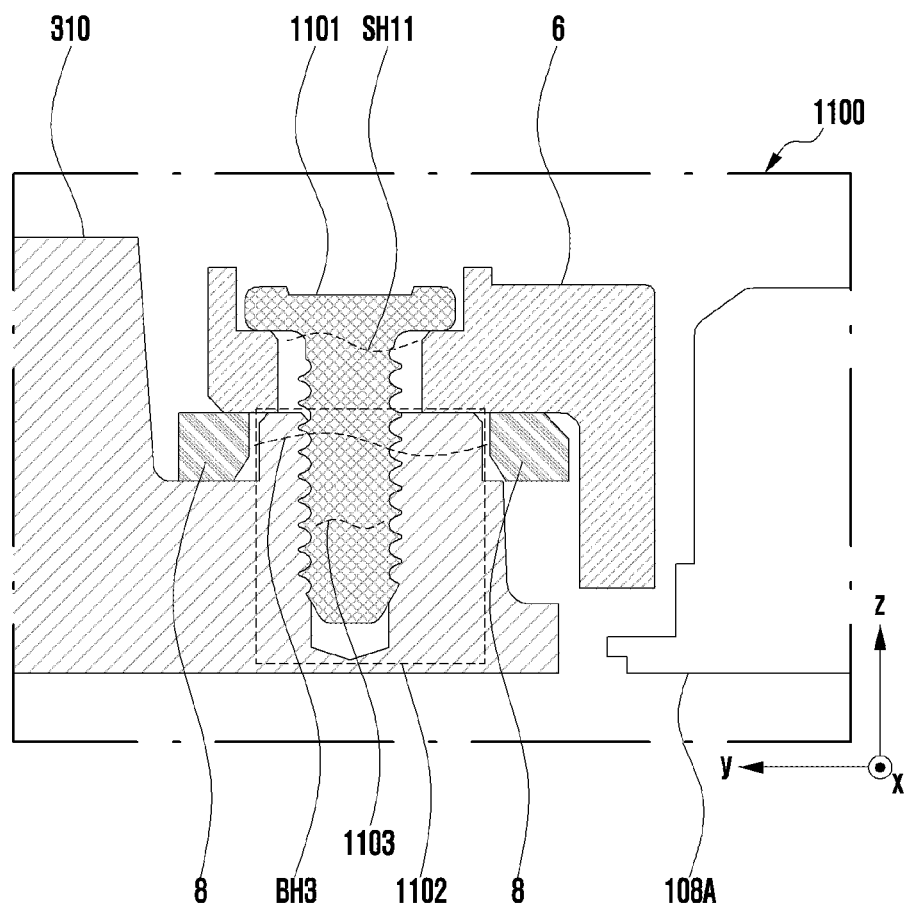
FIG. 11 is a cross-sectional view of a portion of a first electronic device including the camera module assembly according to the example of FIG. 9, according to various embodiments.

FIG. 11 is a cross-sectional view 1100 of a portion of a first electronic device (e.g., the electronic device 100 in FIG.

1) including the camera module assembly 5 according to the example of FIG. 9, according to various embodiments.

Referring to FIG. 11, the first electronic device may include a first rear camera module 108A, a first bracket 6, a third bracket 8, a screw (or bolt) 1101, and/or a first support member 310. The first support member 310 may include a first seating structure capable of stably positioning the first bracket 6, the second bracket 7, and the third bracket 8 connected in the mutual positional relationship illustrated in FIG. 9. The first support member 310 may include a plurality of screw fastening portions (e.g., bosses) for screw fastening with the camera module assembly 5 according to the example of FIG. 9 based on the first seating structure. According to the example of FIG. 9, the first seating structure may be provided to match the mutual positional relationship among the first bracket 6, the second bracket 7, and the third bracket 8, and the corresponding mutual positional relationship among the first rear camera module 108A, the second rear camera module 108B, and the third rear camera module 108C. The first seating structure may include, for example, a recess structure or a fitting structure that allows the camera module assembly 5 according to the example of FIG. 9 to be stably positioned on the first support member 310 without shaking. The screw fastening portions may be provided, for example, in the first seating structure to support screw fastening between the bracket 51 (see FIG. 5) and the first seating structure. In various embodiments, the first seating structure may be interpreted as including screw fastening portions. The first screw hole SH11 in the first bracket 6 and the boss hole BH3 in the third bracket 8 may overlap. In an embodiment, a portion of the first support member 310 may provide a screw fastening portion 1102 (e.g., the boss B in FIG. 6) to which the one corresponding to) which may be fitted into the boss hole BH3 and to which a screw 1101 (e.g., one corresponding to the first screw hole SH11 among the plurality of screws S in FIG. 6) may be fastened. The screw fastening portion (e.g., a boss) 1102 may include, for example, a hole structure 1103 including female threads engageable with male threads of the screw 1101. The hole structure 1103 may be provided in the screw fastening portion 1102 to be aligned with the first screw hole SH11. Although not illustrated, the first support member 310 may include a plurality of screw fastening portions corresponding to the remaining first screw holes SH12 in the first bracket 6 (see FIG. 9), a plurality of second screw holes SH21 and SH22 (see FIG. 9) in the second bracket 7, and a third screw hole SH3 (see FIG. 9) in the third bracket 8.

Figure 12:
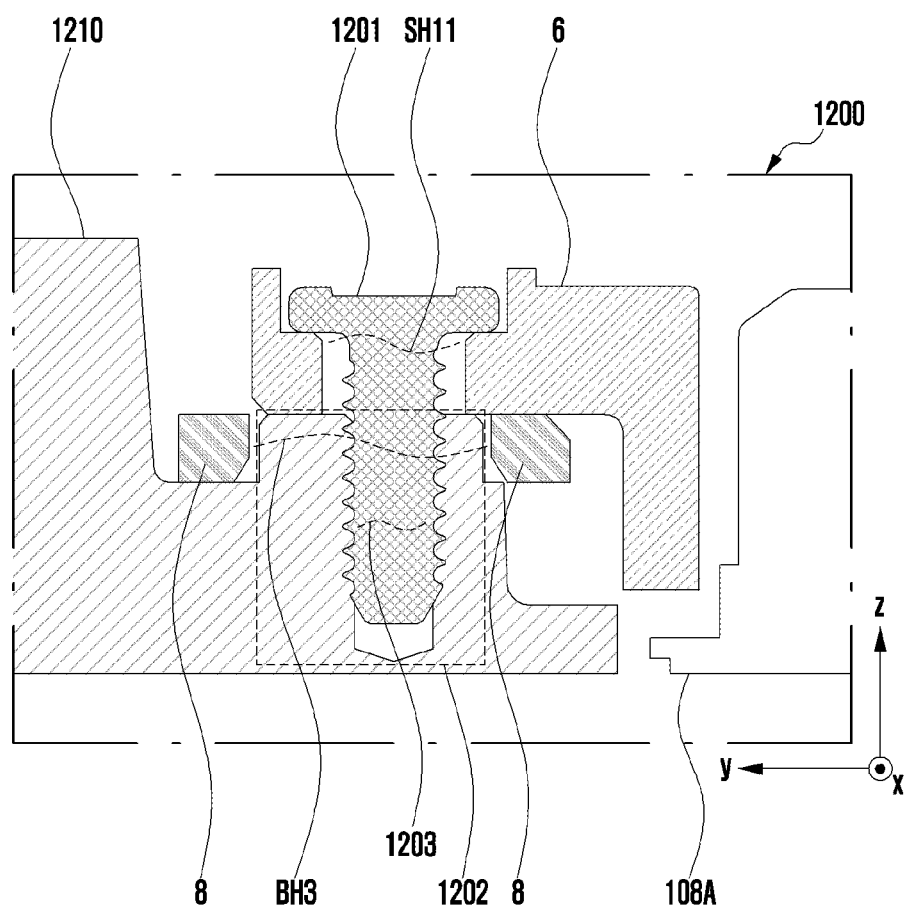
FIG. 12 is a cross-sectional view of a portion of a second electronic device including the camera module assembly according to the example of FIG. 10, according to various embodiments.

FIG. 12 is a cross-sectional view (1200) of a portion of a second electronic device including the camera module assembly 5 according to the example of FIG. 10, according to various embodiments.

Referring to FIG. 12, the second electronic device may include a first rear camera module 108A, a first bracket 6, a third bracket 8, a screw (or bolt) 1201, and/or a first support member 1210. The first support member 1210 is a modified form of the first support member 310 including the first seating structure of FIG. 11, and may include, for example, a second seating structure that is capable of stably positioning the first bracket 6, the second bracket 7, and the third bracket 8 connected each other in the mutual positional relationship illustrated in FIG. 10. According to the example of FIG. 10, the second seating structure may be provided to match the mutual positional relationship among the first bracket 6, the second bracket 7, and the third bracket 8, and the corresponding mutual positional relationship among the first rear camera module 108A, the second rear camera module 108B, and the third rear camera module 108C. The second seating structure may include, for example, a recess structure or a fitting structure that allows the camera module assembly 5 according to the example of FIG. 10 to be stably positioned on the first support member 310 without shaking. The screw fastening portions may be provided, for example, in the second seating structure to support screw fastening between the bracket 51 (see FIG. 5) and the second seating structure. In various embodiments, the second seating structure may be interpreted as including screw fastening portions. The second seating structure is provided on the first support member 310 to correspond to the example of FIG. 10, and may be at least partially different from the first seating structure provided on the first support member 310 to correspond to the example of FIG. 9. The first support member 1210 may include a plurality of screw fastening portions (e.g., bosses) for screw fastening with the camera module assembly 5 according to the example of FIG. 10 based on the second seating structure. The first screw hole SH11 in the first bracket 6 and the boss hole BH3 in the third bracket 8 may overlap. In an embodiment, a portion of the first support member 1210 may provide a screw fastening portion 1202, which is capable of being fitted into the boss hole BH3 and to which the screw 1201 is fastened. The screw fastening portion 1202 (e.g., a boss) may include, for example, a hole structure 1203 including female threads engageable with male threads of the screw 1201. The hole structure 1203 may be provided in the screw fastening portion 1202 to be aligned with the first screw hole SH11. Although not illustrated, the first support member 1210 may include a plurality of screw fastening portions corresponding to the remaining first screw holes SH12 in the first bracket 6 (see FIG. 10), a plurality of second screw holes SH21 and SH22 (see FIG. 10) in the second bracket 7, and a third screw hole SH3 (see FIG. 10) in the third bracket 8.

Figure 13:
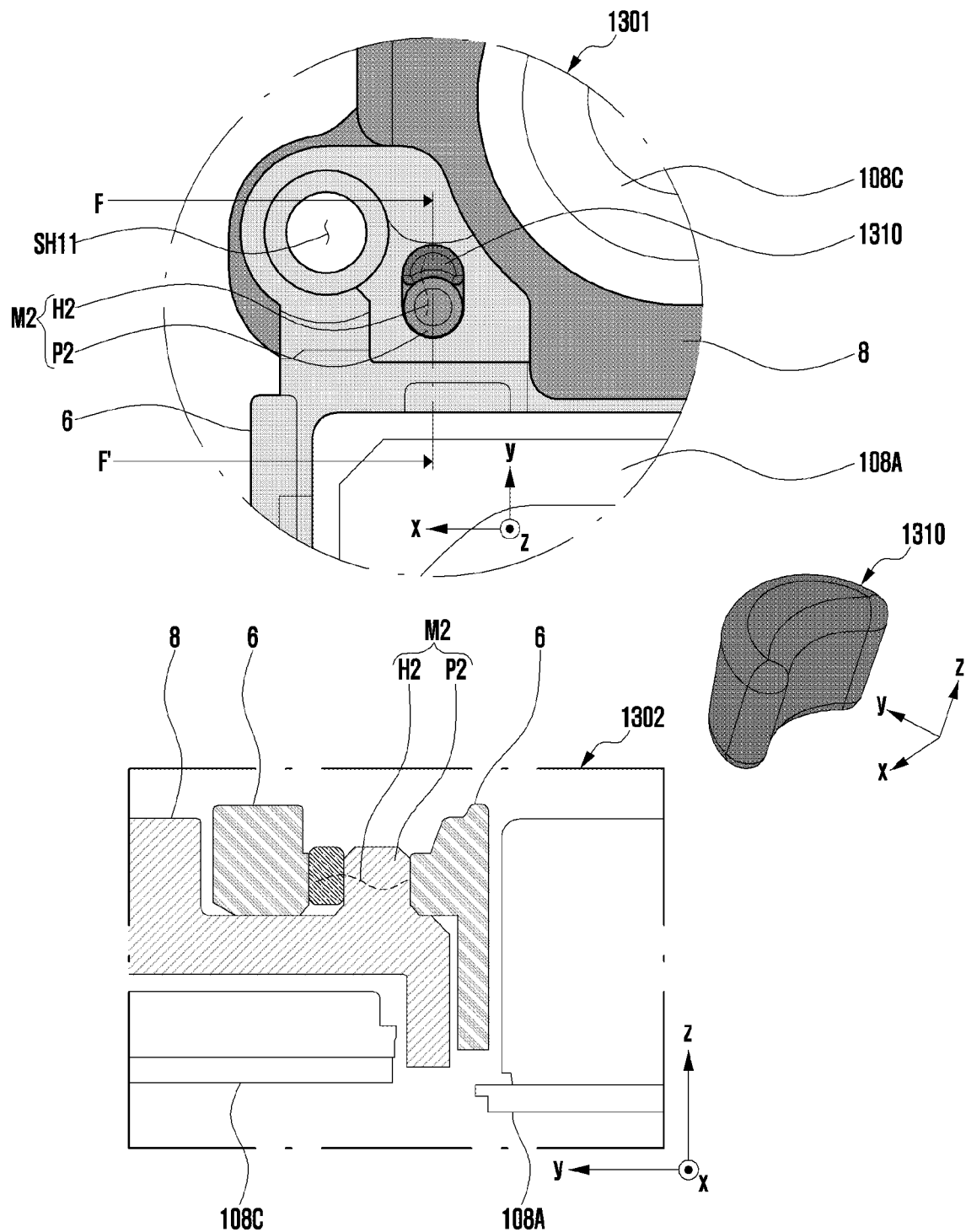
FIG. 13 is a diagram illustrating a portion of a camera module assembly in which a fourth support member is positioned, a perspective view of the fourth support member, and a cross-sectional view of the camera module assembly in which the fourth support member is positioned, taken along line F-F' according to various embodiments.

FIG. 13 is a diagram (1301) illustrating a portion of a camera module assembly 5 according to various embodiments in which a fourth support member 1310 is positioned, a perspective view of the fourth support member 1310, and a cross-sectional view (1302) of the camera module assembly 5 taken along line F-F' according to various embodiments.

Referring to FIG. 13, the fourth support member 1310 may be positioned in the second hole H2 of the second positioning structure M2 so that the position of the second protrusion P2 relative to the second hole H2 may be fixed. The fourth support member 1310 may contribute to allowing the first bracket 6 and the third bracket 8 to be maintained in a fixed mutual positional relationship. The fourth support member 1310 may be a substantially hard or rigid member, or, in some cases, may be a flexible member. Although not illustrated, in order to ensure that the first bracket 6 and the third bracket 8 are capable of being maintained in a fixed mutual positional relationship, a support member such as the fourth support member 1310 may be positioned in the third hole H3 of the fourth positioning structure M4 (see FIG. 5). Although not illustrated, in order to ensure that the first bracket 6 and the second bracket 7 are capable of being maintained in a fixed mutual positional relationship, a support member such as the fourth support member 1310 may be positioned in the first hole H1 of the first positioning structure M1 (see FIG. 5) or the third hole H3 of the third positioning structure M3 (see FIG. 5).

According to various embodiments, in accordance with the seating structure provided on the first support member 310 (see FIG. 4) and the screw fastening portions (e.g., bosses) based on the seating structure, the mutual positional relationship between the first bracket 6 and the second bracket 7 or the mutual positional relationship between the first bracket 6 and the third bracket 7 is adjustable in the z-axis direction. In order to ensure that the first bracket 6 and the second bracket 7 are capable of being maintained in a fixed mutual positional relationship, a separate support member may be positioned between the first bracket 6 and the second bracket 7. In order to ensure that the first bracket 6 and the third bracket 8 are capable of being maintained in a fixed mutual positional relationship, a separate support member may be positioned between the first bracket 6 and the third bracket 8.

Figure 14:
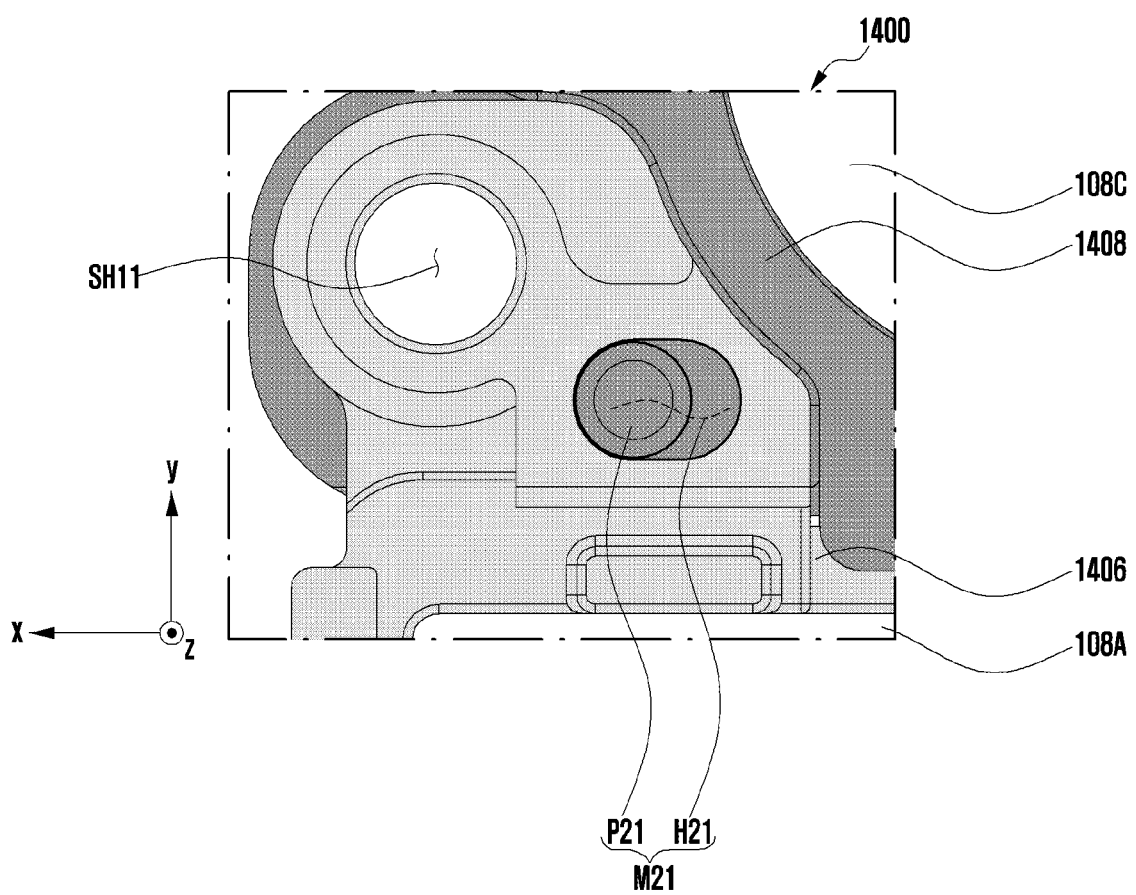
FIG. 14 is a diagram illustrating an example in which a portion of the camera module assembly of FIG. 5 is partially modified according to various embodiments.

FIG. 14 is a diagram (1400) illustrating an example in which a portion of the camera module assembly 5 of FIG. 5 is partially modified according to various embodiments.

Referring to FIG. 14, compared to the positioning structure M2 of FIG. 5, a second positioning structure M21 may be implemented such that the position of a second protrusion P21 relative to the second hole H21 is adjustable in the x-axis direction The second hole H21 may have a greater width in the x-axis direction than, for example, the second protrusion P21. Although not illustrated, the fourth positioning structure M4 of FIG. 5 may be modified such that the position of the fourth protrusion P4 relative to the fourth hole H4 is adjustable in the x-axis direction in substantially the same manner as the second positioning structure M21. Using the second positioning structure M21 and the fourth positioning structure, the mutual positional relationship between the first bracket 1406 on which the first rear camera module 108A is positioned and the third bracket 1408 on which the third rear camera module 108C is positioned may be adjustable in the x-axis direction. In various embodiments, although not illustrated, the first positioning structure M1 and the third positioning structure M3 of FIG. 5 may be modified in substantially the same manner as the second positional adjustment structure M21, so that the mutual positional relationship between the first bracket 1406 on which the first rear camera module 108A is positioned and the second bracket on which the second rear camera module 108C is positioned may be adjustable in the x-axis direction.

Figure 15:
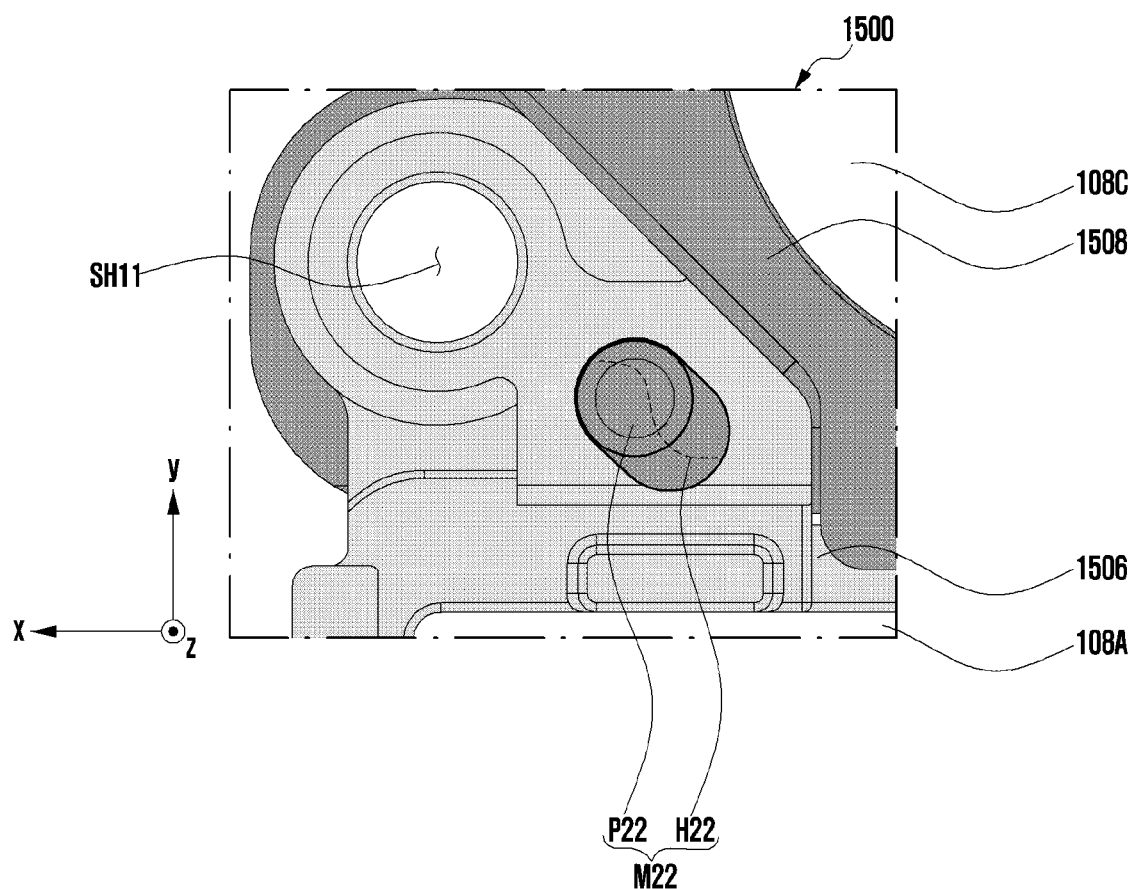
FIG. 15 is a diagram illustrating an example in which a portion of the camera module assembly of FIG. 5 is partially modified according to various embodiments.

FIG. 15 is a diagram (1500) illustrating an example in which a portion of the camera module assembly 5 of FIG. 5 is partially modified according to various embodiments.

Referring to FIG. 15, compared to the positioning structure M2 of FIG. 5, the second positioning structure M22 may be implemented such that the second protrusion P22 relative to the second hole H22 is adjustable in a diagonal direction (e.g., a direction forming an acute angle with respect to the x axis or the y axis). The second hole H22 may have a greater width in the diagonal direction than, for example, the second protrusion P22. Although not illustrated, the fourth positioning structure M4 of FIG. 5 may be modified such that the position of the fourth protrusion relative to the fourth hole is adjustable in the diagonal direction in substantially the same manner as the second positioning structure M22. Using the second positioning structure M22 and the fourth positioning structure, the mutual positional relationship between the first bracket 1506 on which the first rear camera module 108A is positioned and the third bracket 1508 on which the third rear camera module 108C is positioned may be adjustable in the diagonal direction. In various embodiments, although not illustrated, the first positioning structure M1 and the third positioning structure M3 of FIG. 5 may be modified in substantially the same manner as the second positional adjustment structure M22, so that the mutual positional relationship between the first bracket 1506 on which the first rear camera module 108A is positioned and the second bracket on which the second rear camera module 108B is positioned may be adjustable in the diagonal direction.

According to various embodiments (not illustrated), the first positioning structure M1 and the third positioning structure M3 of FIG. 5 may be modified such that the relative positional relationship between the first bracket 6 on which the first rear camera module 108A is positioned and the second bracket 7 on which the second rear camera module 108B is positioned is adjustable in one of a plurality of directions perpendicular to the z-axis direction. For example, in the first positioning structure M1 of FIG. 5, the first hole H1 may be modified to have a greater width in a plurality of directions than the first protrusion P1, and the third hole H3 in the third positioning structure M3 of FIG. 5 may be modified to have a greater width in a plurality of directions than the third protrusion P3.

According to various embodiments (not illustrated), the second positioning structure M2 and the fourth positioning structure M4 of FIG. 5 may be modified such that the relative positional relationship between the first bracket 6 on which the first rear camera module 108A is positioned and the third bracket 8 on which the third rear camera module 108C is positioned is adjustable in one of a plurality of directions perpendicular to the z-axis direction. For example, in the second positioning structure M2 of FIG. 5, the second hole H2 may be modified to have a greater width in a plurality of directions than the second protrusion P2, and the fourth hole H4 in the fourth positioning structure M4 of FIG. 5 may be modified to have a greater width in a plurality of directions than the third protrusion P3.

According to various embodiments (not illustrated), the first positioning structure M1 and the third positioning structure M3 of FIG. 5 may be modified such that the angle between the first bracket 6 on which the first rear camera module 108A is positioned and the second bracket 7 on which the second rear camera module 108B is positioned is adjustable.

According to various embodiments (not illustrated), the first positioning structure M1 and the third positioning structure M3 of FIG. 5 may be modified such that the angle between the first bracket 6 on which the first rear camera module 108A is positioned and the third bracket 8 on which the third rear camera module 108C is positioned is adjustable.

Figure 16:
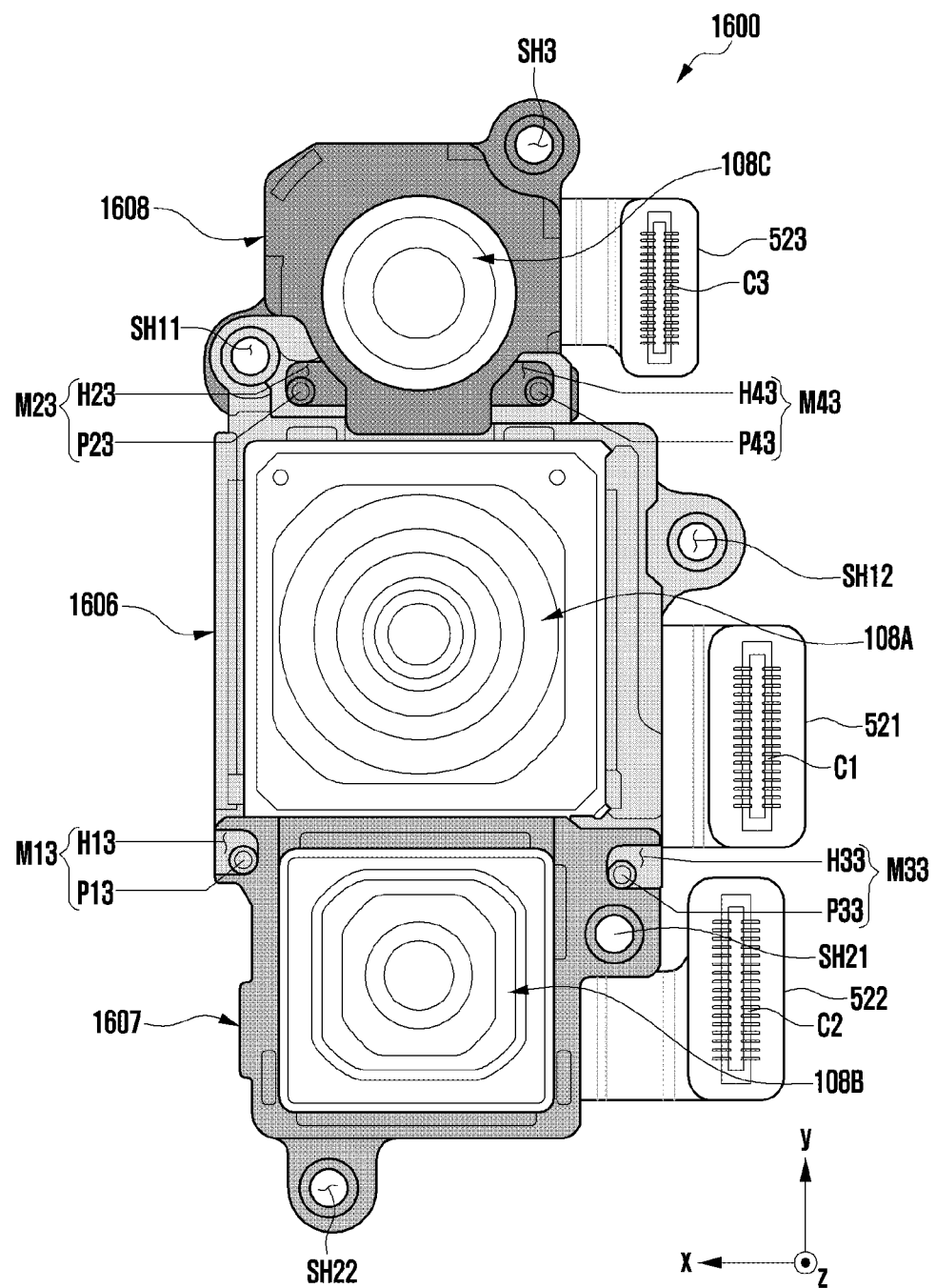
FIG. 16 is a diagram illustrating a camera module assembly according to various embodiments.

FIG. 16 is a diagram illustrating a camera module assembly 1600 according to various embodiments.

Referring to FIG. 16, the camera module assembly 16 may include a first rear camera module 108A, a second rear camera module 108B, a third rear camera module 108C, a first bracket 1606, a second bracket 1607, a third bracket 1608, a first electrical path 521, a second electrical path 522, and/or a third electrical path 523.

According to an embodiment, compared to the first positioning structure M1 of FIG. 5, a first positioning structure M13 may include a notch-shaped first hole H13 in which a first protrusion P13 is positioned. Compared to the third positioning structure M3 of FIG. 5, a third positioning structure M33 may include a notch-shaped third hole H33 in which a third protrusion P33 is positioned. The notch-shaped first hole H13 and the notch-shaped third hole H33 may be recessed opposite to each other. The first positioning structure M13 and the third positioning structure M33 may make the mutual positional relationship between a first bracket 1606 on which the first rear camera module 108A is positioned and a second bracket 1607 on which the second rear camera module 108B is positioned adjustable.

According to an embodiment, compared to the second positioning structure M2 of FIG. 5, a second positioning structure M23 may include a notch-shaped second hole H23 in which a second protrusion P23 is positioned. Compared to the fourth positioning structure M4 of FIG. 5, a fourth positioning structure M43 may include a notch-shaped fourth hole H43 in which a fourth protrusion P43 is positioned. The notch-shaped second hole H23 and the notch-shaped fourth hole H43 may be recessed opposite to each other. The second positioning structure M23 and the fourth positioning structure M43 may make the mutual positional relationship between a first bracket 1606 on which the first rear camera module 108A is positioned and a third bracket 1608 on which the third rear camera module 108C is positioned adjustable.

According to an example embodiment of the disclosure, the electronic device (e.g., the electronic device 100 of FIG. 1) may include: a housing (e.g., the housing 200 of FIG. 1). The electronic device may include a support (e.g., the first support member 310 in FIG. 8) positioned inside the housing. The electronic device may include: a first bracket (e.g., the first bracket 6 in FIG. 8) and a second bracket (e.g., the second bracket 7 in FIG. 8). The first bracket and the second bracket may be positioned on one surface of the support. The electronic device may include a first camera module including a camera (e.g., the first rear camera module 108A in FIG. 8) positioned on the first bracket, and a second camera module including a camera (e.g., the second rear camera module 108B in FIG. 8) positioned on the second bracket. The first bracket may include a first protrusion (e.g., the first protrusion P1 or the third protrusion P3 in FIG. 8). The second bracket may include a first hole (e.g., the first hole H1 or the third hole H3 in FIG. 8). The first protrusion may be inserted into the first hole. The first hole may have a greater width than the first protrusion.

According to an example embodiment of the disclosure, a relative position between the first bracket (e.g., the first bracket 6 in FIG. 8) and the second bracket (e.g., the second bracket 7 in FIG. 8) may be determined based on a position of the first protrusion (e.g., the first protrusion P1 in FIG. 8 or the third protrusion P3 in FIG. 8) relative to the first hole (e.g., the first hole H1 in FIG. 8 or the third hole H3 in FIG. 8).

According to an example embodiment of the disclosure, the first bracket (e.g., the first bracket 6 in FIG. 6) may include a first support portion (e.g., the first support portion 61 in FIG. 6) on which the first camera module (e.g., the first rear camera module 108A in FIG. 6) is positioned. The first bracket may include a first portion (e.g., the first portion ①) in FIG. 6). The first portion may extend from the first support portion to include the first protrusion (e.g., the first protrusion P1 in FIG. 6). The second bracket (e.g., the second bracket 7 in FIG. 6) may include a second support portion (e.g., the second support portion 71 in FIG. 6) on which the second camera module (e.g., the second rear camera module 108B in FIG. 6) is positioned. The second bracket may include a second portion (e.g., the second portion ② in FIG. 6) may be included. The second portion may extend from the second support portion to include the first hole (e.g., the first hole H1 in FIG. 6). The first portion and the second portion may overlap.

According to an example embodiment of the disclosure, the housing (e.g., housing 200 in FIG. 1) may define a front surface (e.g., the front surface 200A in FIG. 2) of the electronic device, a rear surface (e.g., the rear surface 200B in FIG. 2) of the electronic device, and a side surface (e.g., the side surface 200C in FIG. 1 or FIG. 2) of the electronic device. A lens included in the first camera module (e.g., the first rear camera module 108A in FIG. 4) and a lens included in the second camera module (e.g., the second rear camera module 108B in FIG. 4) may face the rear surface. The first bracket (e.g., the first bracket 6 in FIG. 6) and the second bracket (e.g., the second bracket 7 in FIG. 6) may be positioned on one surface of the support (e.g., the first support member 310 in FIG. 6) facing the rear surface. When viewed from above the rear surface, the first portion (e.g., the first portion ① in FIG. 6) and the second portion (e.g., the second portion ② in FIG. 6) may overlap each other.

According to an example embodiment of the disclosure, the first portion (e.g., the first portion ① in FIG. 6) may extend from a position of the first support portion (e.g., the first support portion 61 in FIG. 6) closer to the support (e.g., the first support member 310 in FIG. 6) than the rear surface (e.g., the rear surface 200B in FIG. 2). The second portion (e.g., the second portion ② in FIG. 6) may extend from a position of the second support portion (e.g., the second support portion 71 of FIG. 6) closer to the rear surface than the support.

According to an example embodiment of the disclosure, the first portion (e.g., the fourth portion ④ in FIG. 6) and the second portion (e.g., the third portion ③ in FIG. 6) may be coupled to the support (e.g., the first support member 310 in FIG. 6) using a screw.

According to an example embodiment of the disclosure, the first bracket (e.g., the first bracket 6 in FIG. 6) may include a first support portion (e.g., the first support portion 61 in FIG. 6) on which the first camera module (e.g., the first rear camera module 108A in FIG. 6) is positioned. The first bracket may include one or more first screw holes (e.g., the plurality of first screw holes SH11 and SH12 in FIG. 6) for screw fastening with the support (e.g., the first support member 310 of FIG. 6). The one or more first screw holes may be provided in a portion extending from the first support portion. The second bracket (e.g., the second bracket 7 in FIG. 6) may include a second support portion (e.g., the second support portion 71 in FIG. 6) on which the second camera module (e.g., the second rear camera module 108B in FIG. 6) is positioned. The second bracket may include one or more second screw holes (e.g., the plurality of second screw holes SH21 and SH22 in FIG. 6) for screw fastening with the support member. The one or more second screw holes may be provided in a portion extending from the second support portion.

According to an example embodiment of the disclosure, the housing (e.g., housing 200 in FIG. 1) may define a front surface (e.g., the front surface 200A in FIG. 1) of the electronic device, a rear surface (e.g., the rear surface 200B in FIG. 2) of the electronic device, and a side surface (e.g., the side surface 200C in FIG. 1 or FIG. 2) of the electronic device. A lens included in the first camera module (e.g., the first rear camera module 108A in FIG. 4) and a lens included in the second camera module (e.g., the second rear camera module 108B in FIG. 4) may face the rear surface. The distance between a first optical center of the first camera module and a second optical center of the second camera module may be determined by a relative position between the first bracket (e.g., the first bracket 6 in FIG. 8) and the second bracket (e.g., the second bracket 7 in FIG. 8) based on the position of the first protrusion (e.g., the first protrusion P1 or the third protrusion P3 in FIG. 8) relative to the first hole (e.g., the first hole H1 or the third hole H3 in FIG. 8).

According to an example embodiment of the disclosure, the housing (e.g., the housing 200 in FIG. 1) may include a rear plate (e.g., the rear plate 220 in in FIG. 4) that defines the rear surface (e.g., the rear surface 200B in FIG. 2) of the electronic device. The rear plate may include a first rear plate (e.g., the first rear plate 221 in FIG. 4), and a second rear plate (e.g., the second rear plate 222 of FIG. 4) connected to the first rear plate. The first rear plate may form a partial area of the rear surface, and the second rear plate may form another partial area of the rear surface. The second rear plate may include a first light transmission area (e.g., the first light transmission area 2221 in FIG. 4) corresponding to the first camera module (e.g., the first rear camera module 108A in FIG. 4), and a second light transmission area (e.g., the second light transmission area 2222 in FIG. 4) corresponding to the second camera module (e.g., the second rear camera module 108B in FIG. 4).

According to an example embodiment of the disclosure, the electronic device may further include a third bracket (e.g., the third bracket 8 in FIG. 6) positioned on one surface of the support (e.g., the first support member 310 of FIG. 6), and a third camera module (e.g., the third rear camera module 108C of FIG. 6) positioned on the third bracket. The third bracket may include a second protrusion (e.g., the second protrusion P2 or the fourth protrusion P4 in FIG. 8). The first bracket may include a second hole (e.g., the second hole H2 or the fourth hole H4 in FIG. 8). The second protrusion may be inserted into the second hole. The second hole may have a greater width than the second protrusion.

According to an example embodiment of the disclosure, the first bracket (e.g., the first bracket 6 in FIG. 6) may include a first support portion (e.g., the first support portion 61 in FIG. 6) on which the first camera module (e.g., the first rear camera module 108A in FIG. 6) is positioned. The first bracket may include a first portion (e.g., the first portion ① in FIG. 6) extending from the first support portion to include the first protrusion (e.g., the first protrusion P1 in FIG. 6). The first bracket may include a third portion (e.g., the third portion ③ in FIG. 6) extending from the first support portion to include the second hole (e.g., the second hole H2 in FIG. 6). The second bracket (e.g., the second bracket 7 in FIG. 6) may include a second support portion (e.g., the second support portion 71 in FIG. 6) on which the second camera module (e.g., the second rear camera module 108B in FIG. 6) is positioned. The second bracket may include a second portion (e.g., the second ② in FIG. 6) extending from the second support portion to include the first hole (e.g., the first hole H1 in FIG. 6). The first portion and the second portion may overlap. The third bracket (e.g., the third bracket 8 in FIG. 6) may include a third support portion (e.g., the third support portion 81 in FIG. 6) on which the third camera module (e.g., the third rear camera module 108C in FIG. 6) is positioned. The third bracket 8 may include a fourth portion (e.g., the fourth portion ④ in FIG. 6) extending from the third support portion to include the second protrusion (e.g., the second protrusion P2 in FIG. 8). The third portion and the fourth portion may overlap.

According to an example embodiment of the disclosure, the relative position between the first bracket (e.g., the first bracket 6 in FIG. 8) and the second bracket (e.g., the second bracket 7 in FIG. 8) may be determined based on the position of the first protrusion (e.g., the first protrusion P1 or the third protrusion P3 in FIG. 8) relative to the first hole (e.g., the first hole H1 or the third hole H3 in FIG. 8). The relative position between the first bracket and the third bracket (e.g., the third bracket 8 in FIG. 8) may be determined based on the position of the second protrusion (e.g., the second protrusion P2 or the fourth protrusion P4 in FIG. 8) relative to the second hole (e.g., the second hole H2 or the fourth hole H4 in FIG. 8).

According to an example embodiment of the disclosure, the housing (e.g., housing 200 in FIG. 1) may define a front surface (e.g., the front surface 200A in FIG. 1) of the electronic device, a rear surface (e.g., the rear surface 200B in FIG. 2) of the electronic device, and a side surface (e.g., the side surface 200C in FIG. 1 or FIG. 2) of the electronic device. A lens included in the first camera module (e.g., the first rear camera module 108A in FIG. 4), a lens included in the second camera module (e.g., the second rear camera module 108B in FIG. 4), and a lens included in the third camera module (e.g., the third rear camera module 108C of FIG. 4) may face the rear surface. When viewed from above the rear side, the first camera module may be positioned between the second camera module and the third camera module.

According to an example embodiment of the disclosure, the distance between a first optical center of the first camera module (e.g., the first rear camera module 108A in FIG. 8) and a second optical center of the second camera module (e.g., the second rear camera module 108B in FIG. 8) may be determined by a relative position between the first bracket (e.g., the first bracket 6 in FIG. 8) and the second bracket (e.g., the second bracket 7 in FIG. 8) based on the position of the first protrusion (e.g., the first protrusion P1 or the third protrusion P3 in FIG. 8) relative to the first hole (e.g., the first hole H1 or the third hole H3 in FIG. 8). The distance between a first optical center of the first camera module and a third optical center of the third camera module (e.g., the third rear camera module 108C in FIG. 8) may be determined by a relative position between the first bracket and the third bracket (e.g., the third bracket 8 in FIG. 8) based on the position of the second protrusion (e.g., the second protrusion P2 or the fourth protrusion P4 in FIG. 8) relative to the second hole (e.g., the second hole H2 or the fourth hole H4 in FIG. 8).

According to an example embodiment of the disclosure, the electronic device may further include another support (e.g., the fourth support member 1310 in FIG. 13) positioned in the first hole to fix the position of the first protrusion relative to the first hole.

According to an example embodiment of the disclosure, the camera bracket (e.g., the bracket 51 in FIG. 5) may include a first bracket (e.g., the first bracket 6 in FIG. 5) on which the first camera module (e.g., the first rear camera module 108A in FIG. 5) is positioned. The camera bracket may include a second bracket (e.g., the second bracket 7 in FIG. 5) on which the second camera module (e.g., the second rear camera module 108B in FIG. 5) is positioned. The first bracket may include a first protrusion (e.g., the first protrusion P1 or the third protrusion P3 in FIG. 5). The second bracket may include a first hole (e.g., the first hole H1 or the third hole H3 in FIG. 5) into which the first protrusion is inserted. The first hole may have a greater width than the first protrusion.

According to an example embodiment of the disclosure, the relative position between the first bracket (e.g., the first bracket 6 in FIG. 5) and the second bracket (e.g., the second bracket 7 in FIG. 5) may be determined based on the position of the first protrusion (e.g., the first protrusion P1 or the third protrusion P3 in FIG. 5) relative to the first hole (e.g., the first hole H1 or the third hole H3 in FIG. 5).

According to an example embodiment of the disclosure, the first bracket (e.g., the first bracket 6 in FIG. 5) may include a first support portion (e.g., the first support portion 61 in FIG. 5) on which the first camera module (e.g., the first rear camera module 108A in FIG. 5) is positioned. The first bracket may include a first portion (e.g., the first portion ① in FIG. 5) extending from the first support portion to include the first protrusion (e.g., the first protrusion P1 or the third protrusion P3 in FIG. 5). The second bracket (e.g., the second bracket 7 in FIG. 5) may include a second support portion (e.g., the second support portion 71 in FIG. 5) on which the second camera module (e.g., the second rear camera module 108B in FIG. 5) is positioned. The second bracket may include a second portion (e.g., the second ② in FIG. 5) extending from the second support portion. The second portion may include the first hole (e.g., the first hole H1 or the third hole H3 in FIG. 5) and overlap the first portion.

According to an example embodiment of the disclosure, the first bracket (e.g., the first bracket 6 in FIG. 5) may include a first support portion (e.g., the first support portion 61 in FIG. 5) on which the first camera module (e.g., the first rear camera module 108A in FIG. 5) is positioned. The first bracket may include one or more first screw holes (e.g., the plurality of first screw holes SH11 and SH12 in FIG. 5) for screw fastening with the support member (e.g., the first support member 310 in FIG. 6). The one or more first screw holes may be provided in a portion extending from the first support portion. The second bracket (e.g., the second bracket 7 in FIG. 5) may include a second support portion (e.g., the second support portion 71 in FIG. 5) on which the second camera module (e.g., the second rear camera module 108B in FIG. 5) is positioned. The second bracket 7 may include one or more second screw holes (e.g., the plurality of second screw holes SH21 and SH22 in FIG. 5) for screw fastening. The one or more second screw holes may be provided in a portion extending from the second support portion.

According to an example embodiment of the disclosure, the camera bracket (e.g., the bracket 51 in FIG. 5) may further include a third bracket (e.g., the third bracket 8 in FIG. 5) on which the third camera module (e.g., the third rear camera module 108C in FIG. 5) is positioned. The third bracket may include a second protrusion (e.g., the second protrusion P2 or the fourth protrusion P4 in FIG. 5). The first bracket (e.g., the first bracket 6 in FIG. 5) may include a second hole (e.g., the second hole H2 or the fourth hole H4 of FIG. 5) into which the second protrusion is inserted. The second hole may have a greater width than the second protrusion. The relative position between the first bracket and the second bracket (e.g., the second bracket 7 in FIG. 5) may be determined based on the position of the first protrusion (e.g., the first protrusion P1 or the third protrusion P3 in FIG. 5) relative to the first hole (e.g., the first hole H1 or the third hole H3 in FIG. 5). The relative position between the first bracket and the third bracket may be determined based on a position of the second protrusion relative to the second hole.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing;
   a support positioned inside the housing;
   first and second brackets positioned on one surface of the support;
   a first camera module including a camera positioned on the first bracket; and
   a second camera module including a camera positioned on the second bracket,
   wherein the first bracket includes a first protrusion, and the second bracket includes a first hole into which the first protrusion is insertable, the first hole being configured to enable adjustment of a relative translational position between the first camera module and the second camera module.

2. The electronic device of claim 1, wherein a relative translational position between the first bracket and the second bracket is determined based on a position of the first protrusion relative to the first hole.

3. The electronic device of claim 1, wherein the first bracket includes a first support portion on which the first camera module is positioned, and a first portion extending from the first support portion and including the first protrusion, and
   the second bracket includes a second support portion on which the second camera module is positioned, and a second portion extending from the second support portion and including the first hole, the second portion overlapping the first portion.

4. The electronic device of claim 3, wherein the housing defines a front surface of the electronic device, a rear surface of the electronic device, and a side surface of the electronic device,
   a lens included in the first camera module and a lens included in the second camera module face the rear surface,
   the first bracket and the second bracket are disposed on a first surface of the support facing the rear surface, and
   when viewed from above the rear surface, the first portion and the second portion overlap each other.

5. The electronic device of claim 4, wherein the first portion extends from a position of the first support portion closer to the support than the rear surface, and
   the second portion extends from a position of the second support portion closer to the rear surface than the support.

6. The electronic device of claim 4, further comprising a screw for coupling the first portion and the second portion to the support.

7. The electronic device of claim 1, wherein the first bracket includes a first support portion on which the first camera module is positioned, and one or more first holes provided in a portion extending from the first support portion and each configured to receive a screw for fastening with the support, and
   the second bracket includes a second support portion on which the second camera module is positioned, and one or more second holes provided in a portion extending from the second support portion and each configured to receive a screw for fastening with the support.

8. The electronic device of claim 1, wherein the housing defines a front surface of the electronic device, a rear surface of the electronic device, and a side surface of the electronic device,
   a lens included in the first camera module and a lens included in the second camera module face the rear surface, and a distance between a first optical center of the first camera module and a second optical center of the second camera module is determined by a relative distance between the first bracket and the second bracket based on a position of the first protrusion relative to the first hole.

9. The electronic device of claim 8, wherein the housing includes a rear plate defining the rear surface of the electronic device, and
the rear plate includes:
a first rear plate defining a first partial area of the rear surface; and
a second rear plate connected to the first rear plate and defining a second partial area of the rear surface, wherein the second rear plate includes a first light transmission area corresponding to the first camera module and a second light transmission area corresponding to the second camera module.

10. The electronic device of claim 1, further comprising a third bracket positioned on a first surface of the support; and
a third camera module positioned on the third bracket,
wherein the third bracket includes a second protrusion, and the first bracket includes a second hole into which the second protrusion is insertable, the second hole being configured to enable adjustment of a relative translational position between the first camera module and the third camera module.

11. The electronic device of claim 10, wherein the first bracket includes a first support portion on which the first camera module is positioned, a first portion extending from the first support portion and including the first protrusion, and a third portion extending from the first support portion and including the second hole,
the second bracket includes a second support portion on which the second camera module is positioned, and a second portion extending from the second support portion and including the first hole and overlapping the first portion, and
the third bracket includes a third support portion on which the third camera module is positioned, and a fourth portion extending from the third support portion and including the second protrusion and overlapping the third portion.

12. The electronic device of claim 10, wherein a relative position between the first bracket and the second bracket is determined based on a position of the first protrusion relative to the first hole, and
a relative position between the first bracket and the third bracket is determined based on a position of the second protrusion relative to the second hole.

13. The electronic device of claim 10, wherein the housing defines a front surface of the electronic device, a rear surface of the electronic device, and a side surface of the electronic device,
a lens included in the first camera module, a lens included in the second camera module, and a lens included in the third camera module face the rear surface, and
when viewed from above the rear surface, the first camera module is positioned between the second camera module and the third camera module.

14. The electronic device of claim 13, wherein a distance between a first optical center of the first camera module and a second optical center of the second camera module is determined by a relative distance between the first bracket and the second bracket based on a position of the first protrusion relative to the first hole, and
a distance between the first optical center of the first camera module and a third optical center of the third camera module is determined by a relative distance between the first bracket and the third bracket based on a position of the second protrusion relative to the second hole.

15. The electronic device of claim 1, further comprising another support positioned in the first hole to fix a position of the first protrusion relative to the first hole.

16. A camera bracket comprising:
a first bracket on which a first camera module including a camera is positioned; and
a second bracket on which a second camera module including a camera is positioned,
wherein the first bracket includes a first protrusion, and the second bracket includes a first hole into which the first protrusion is insertable, the first hole being configured to enable adjustment of a relative translational position between the first camera module and the second camera module.

17. The camera bracket of claim 16, wherein a relative translational position between the first bracket and the second bracket is determined based on a position of the first protrusion relative to the first hole.

18. The camera bracket of claim 16, wherein the first bracket includes a first support portion on which the first camera module is positioned, and a first portion extending from the first support portion and including the first protrusion, and
the second bracket includes a second support portion on which the second camera module is positioned, and a second portion extending from the second support portion and including the first hole and overlapping the first portion.

19. The camera bracket of claim 16, wherein the first bracket includes a first support portion on which the first camera module is positioned, and one or more first holes provided in a portion extending from the first support portion and each configured to receive a screw for fastening, and
the second bracket includes a second support portion on which the second camera module is positioned, and one or more second holes provided in a portion extending from the second support portion and each configured to receive a screw for fastening.

20. The camera bracket of claim 16, further comprising a third bracket on which a third camera module comprising a camera is positioned,
wherein the third bracket includes a second protrusion, and the first bracket includes a second hole into which the second protrusion is insertable, the second hole being configured to enable adjustment of a relative translational position between the first camera module and the third camera module,
a relative position between the first bracket and the second bracket is determined based on a position of the first protrusion relative to the first hole, and
a relative position between the first bracket and the third bracket is determined based on a position of the second protrusion relative to the second hole.

* * * * *